US012036794B2

(12) United States Patent
Shimosato et al.

(10) Patent No.: US 12,036,794 B2
(45) Date of Patent: Jul. 16, 2024

(54) LIQUID EJECTION HEAD

(71) Applicant: TOSHIBA TEC KABUSHIKI KAISHA, Tokyo (JP)

(72) Inventors: Masashi Shimosato, Mishima Shizuoka (JP); Tsubasa Konishi, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 150 days.

(21) Appl. No.: 17/751,622

(22) Filed: May 23, 2022

(65) Prior Publication Data

US 2023/0101170 A1 Mar. 30, 2023

(30) Foreign Application Priority Data

Sep. 24, 2021 (JP) ................................. 2021-155569

(51) Int. Cl.

*B41J 2/14* (2006.01)
*B41J 2/145* (2006.01)
*B41J 2/165* (2006.01)

(52) U.S. Cl.

CPC ............. *B41J 2/1433* (2013.01); *B41J 2/145* (2013.01); *B41J 2/16505* (2013.01)

(58) Field of Classification Search

CPC ...... B41J 2/1433; B41J 2/145; B41J 2/16505; B41J 2/14032

See application file for complete search history.

(56) References Cited

U.S. PATENT DOCUMENTS 8,025,368 B2 9/2011 Watanabe
8,403,462 B2 3/2013 Watanabe
2020/0290354 A1* 9/2020 Shimosato ............ B41J 2/1642

FOREIGN PATENT DOCUMENTS

JP 2016159441 A * 9/2016
JP 2016159441 A 9/2016

OTHER PUBLICATIONS

U.S. Appl. No. 17/729,922, filed Apr. 26, 2022.
U.S. Appl. No. 17/746,888, filed May 17, 2022.
Extended European Search Report mailed Dec. 13, 2022 in corresponding European Patent Application No. 22184694.2, 22 pages.

* cited by examiner

*Primary Examiner* — Jason S Uhlenhake
(74) *Attorney, Agent, or Firm* — Kim & Stewart LLP

(57) ABSTRACT

A liquid ejection head of a side shooter type includes a plate including nozzles arranged along a first direction and through which liquid is ejected, an actuator including pressure chambers communicating with the nozzles, dummy chambers each disposed between two adjacent pressure chambers, and sidewalls separating the chambers along the first direction and deformable to change a volume of each pressure chamber according to a signal, and covers having apertures and partly covering both ends of each pressure chamber in a second direction intersecting the first direction such that the pressure chambers communicate with a common chamber at both ends thereof through the apertures. Each cover includes a first portion on and between the sidewalls and a second portion other than the first portion, and a first length of the first portion is equal to or greater than a second length of the second portion in the second direction.

20 Claims, 16 Drawing Sheets

FIG. 7

| | n | 1 | 2 | 3 | 4 | 5 | AVERAGE | STANDARD DEVIATION |
|---|---|---|---|---|---|---|---|---|
| EXAMPLE 1 (50% OR 250 μm IN GROOVE) | WIDTH a [μm] | 27.8 | 28.0 | 27.9 | 28.1 | 28.1 | 27.98 | 0.130384 |
| | WIDTH b [μm] | 27.8 | 27.9 | 28.2 | 28.1 | 27.9 | 27.98 | 0.164317 |
| COMPARATIVE EXAMPLE 1 (60% OR 200 μm IN GROOVE) | WIDTH a [μm] | 27.8 | 28.1 | 27.9 | 27.9 | 28.0 | 27.94 | 0.114018 |
| | WIDTH b [μm] | 25.3 | 25.8 | 25.0 | 25.1 | 25.6 | 25.36 | 0.336155 |

DESIGNED VALUE
APERTURE LENGTH 500μm
APERTURE WIDTH 28μm
GROOVE WIDTH 48μm

<TEST EXAMPLE 1>

<TEST EXAMPLE 2>

<TEST EXAMPLE 1>

<TEST EXAMPLE 3>

LIQUID EJECTION HEAD

CROSS-REFERENCE TO RELATED APPLICATION

This application is based upon and claims the benefit of priority from Japanese Patent Application No. 2021-155569, filed Sep. 24, 2021, the entire contents of which are incorporated herein by reference.

FIELD

Embodiments described herein relate generally to a liquid ejection head and a liquid ejection device.

BACKGROUND

In recent years, increased performance has been required for inkjet heads, and it has become issues how to achieve high speed ink ejection and increase the amount of ejected droplets. For example, a shear mode shared wall type inkjet head has high power and is suitable for ejecting high-viscosity ink or large droplets. In a shear mode shared wall type inkjet head, a so-called three-cycle drive is generally used in which the same drive column is shared by two pressure chambers and only one-third of the plurality of arranged pressure chambers is simultaneously driven during an ejection operation. Furthermore, an independent drive head has been developed in which one pressure chamber is driven by two independent drive columns, with dummy pressure chambers being provided on both sides of the driven pressure chamber. In some examples, a structure has been developed in which a large number of grooves are formed in a piezoelectric body, but the inlets and outlets are closed every other groove, the grooves where the inlets and outlets are not closed are used as pressure chambers, the closed grooves are used as air chambers (dummy chambers), and the grooves can be independently driven.

In such an inkjet head, ink is replenished from a common liquid chamber after the ink droplets are ejected. At this time, a phenomenon occurs in which the meniscus rises due to overshooting by the nozzle. The smaller the fluid resistance along the flow path from the common liquid chamber to the nozzle, the larger the overshoot, and if this overshoot is too large, the next ink ejection cannot be performed with a stable meniscus. Therefore, in order to increase the speed in the inkjet head, it is required to quickly mitigate the rise of the meniscus and ensure stable ejection characteristics.

BRIEF DESCRIPTION OF THE DRAWINGS

FIG. 7 is a table showing measured values of the dimensions of apertures of inkjet heads according to Example 1 and Comparative Example 1.

DETAILED DESCRIPTION

Embodiments provide a liquid ejection head with stable liquid ejection characteristics.

In general, according to one embodiment, a liquid ejection head of a side shooter type includes a plate including a plurality of nozzles arranged along a first direction and through which liquid is ejected. The liquid ejection head further includes an actuator including a plurality of pressure chambers each communicating with a corresponding one of the nozzles, a plurality of dummy chambers each disposed between two of the pressure chambers that are adjacent to each other, and a plurality of sidewalls separating the pressure and dummy chambers along the first direction and deformable to change a volume of each of the pressure chambers according to a drive signal. The liquid ejection head further includes a pair of covers having a plurality of apertures and partly covering both ends of each of the pressure chambers in a second direction intersecting the first direction such that the pressure chambers communicate with a common chamber at both ends thereof through the apertures. Each of the covers includes a first portion on and between the sidewalls and a second portion other than the first portion, and a first length in the second direction of the first portion is equal to or greater than a second length in the second direction of the second portion.

Figure 1:
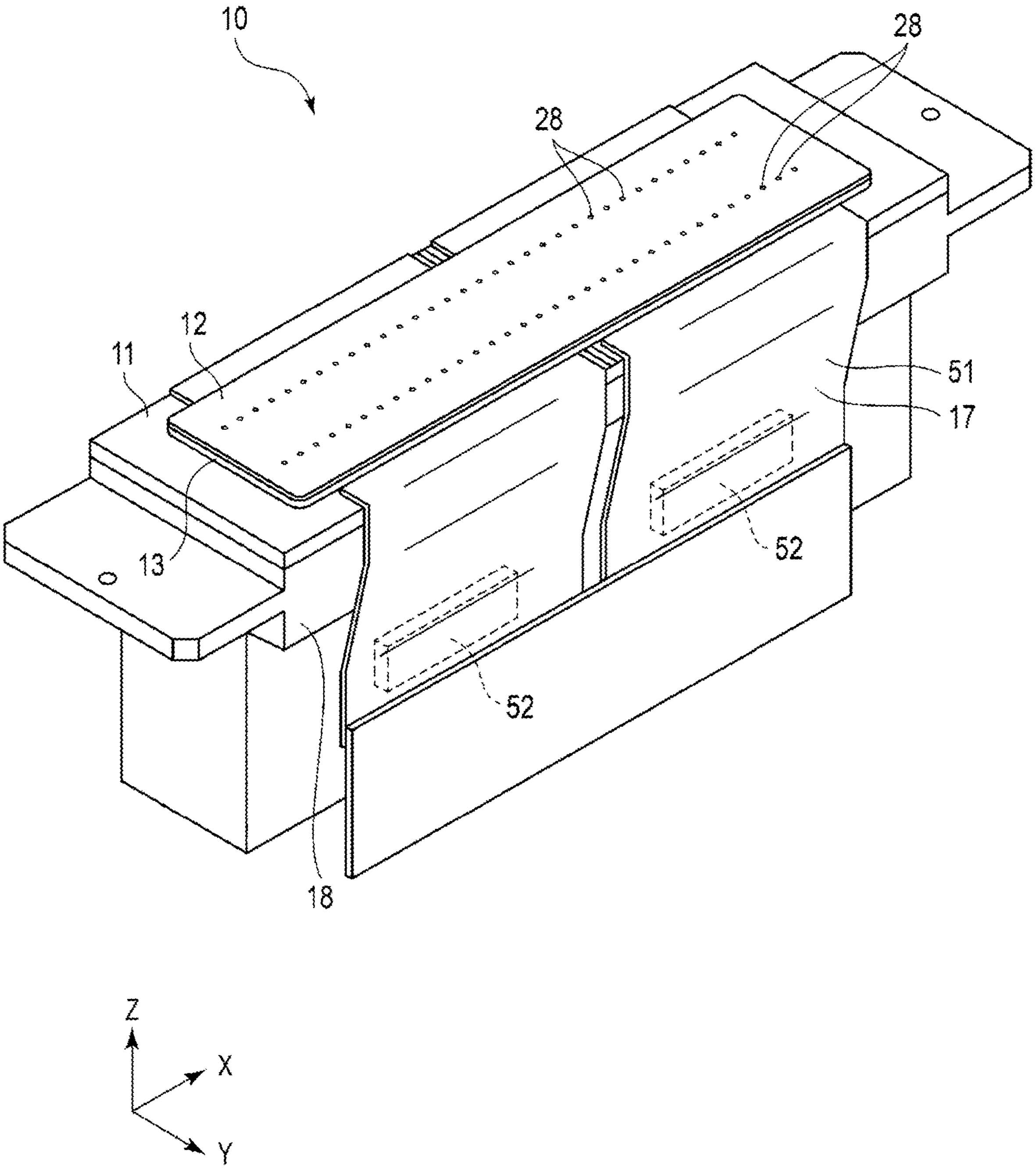
FIG. 1 is a perspective view showing an inkjet head according to an embodiment.
Figure 2:
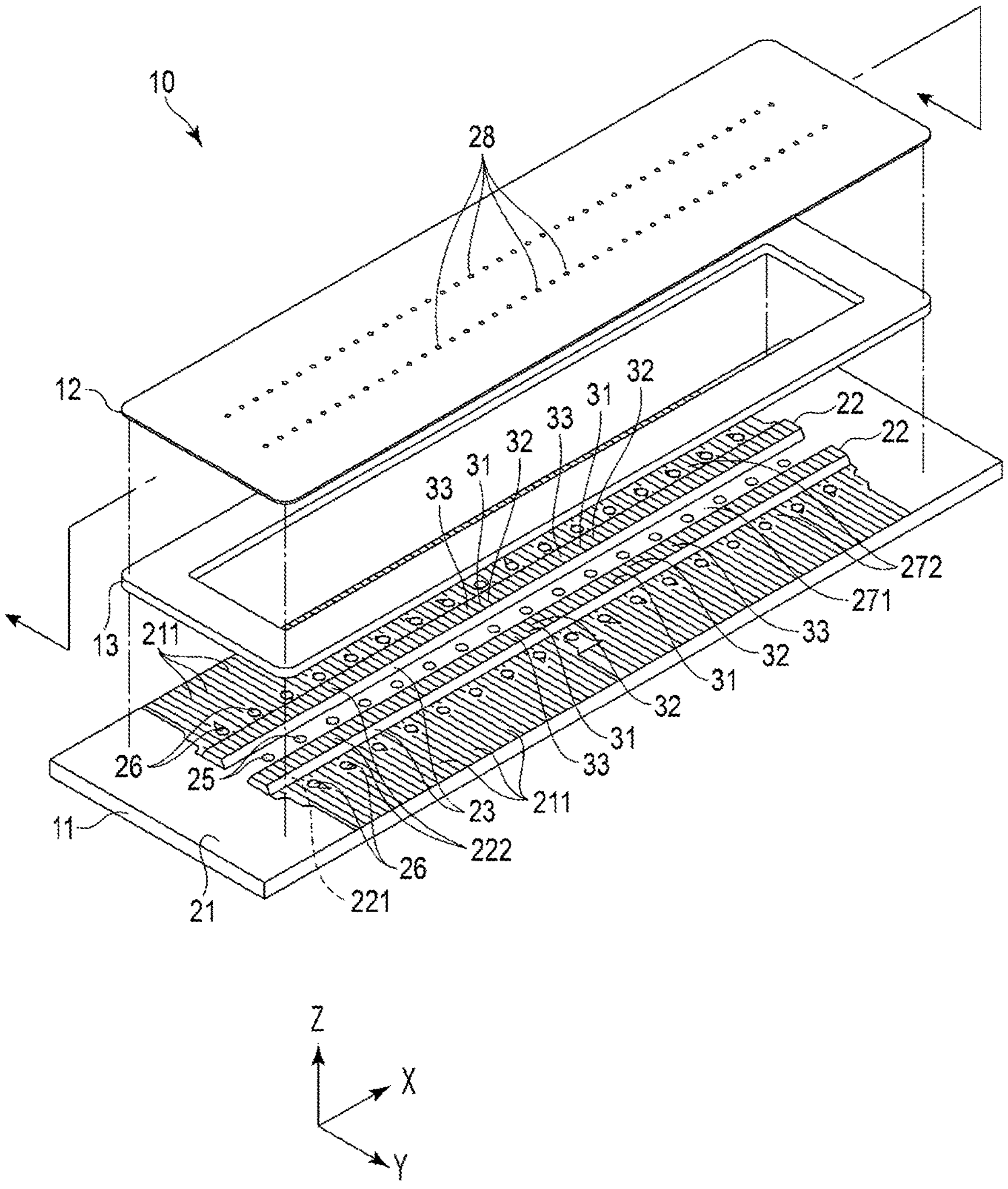
FIG. 2 is an exploded perspective view showing an inkjet head according to an embodiment.
Figure 3:
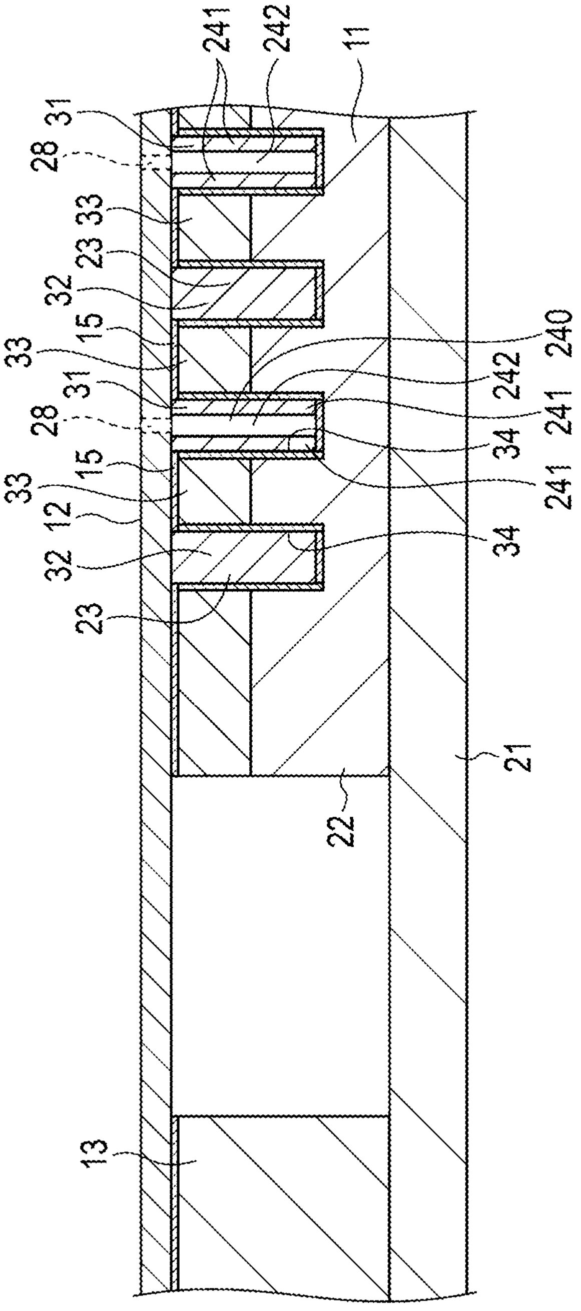
FIG. 3 is an enlarged cross-sectional view showing an inkjet head according to an embodiment.
Figure 4:
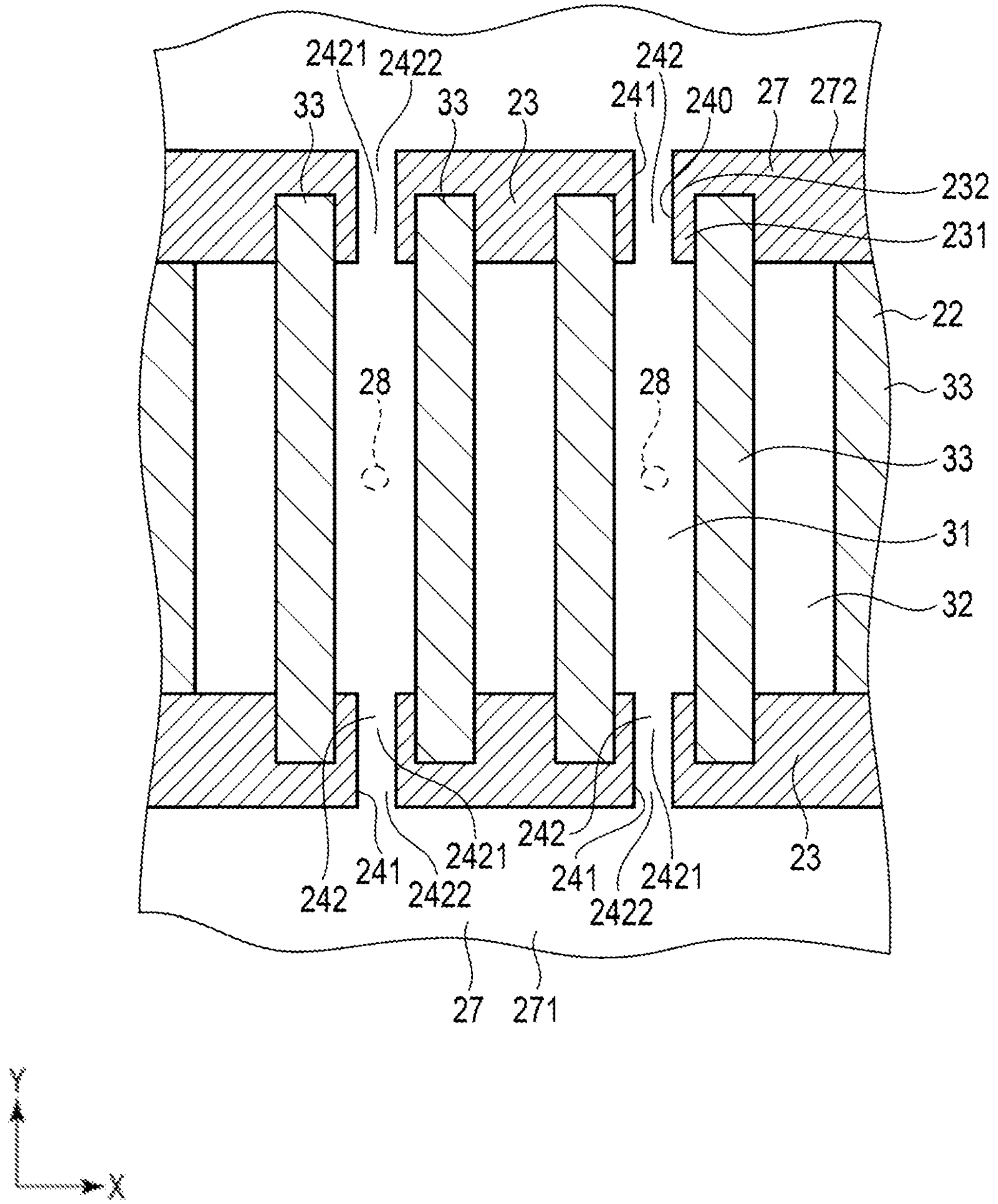
FIG. 4 is an enlarged cross-sectional view showing an inkjet head according to an embodiment.
Figure 5:
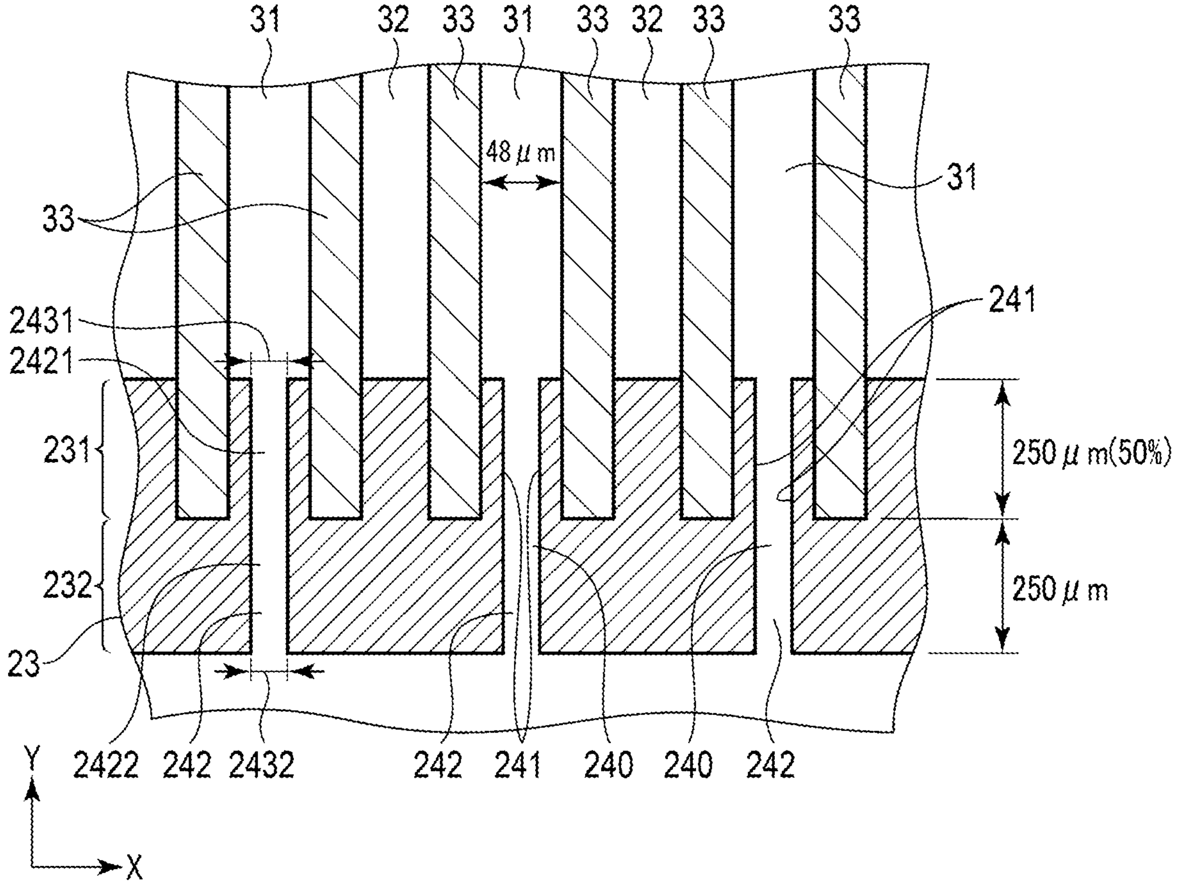
FIG. 5 is a diagram showing an aperture unit of an inkjet head according to Example 1.
Figure 6:
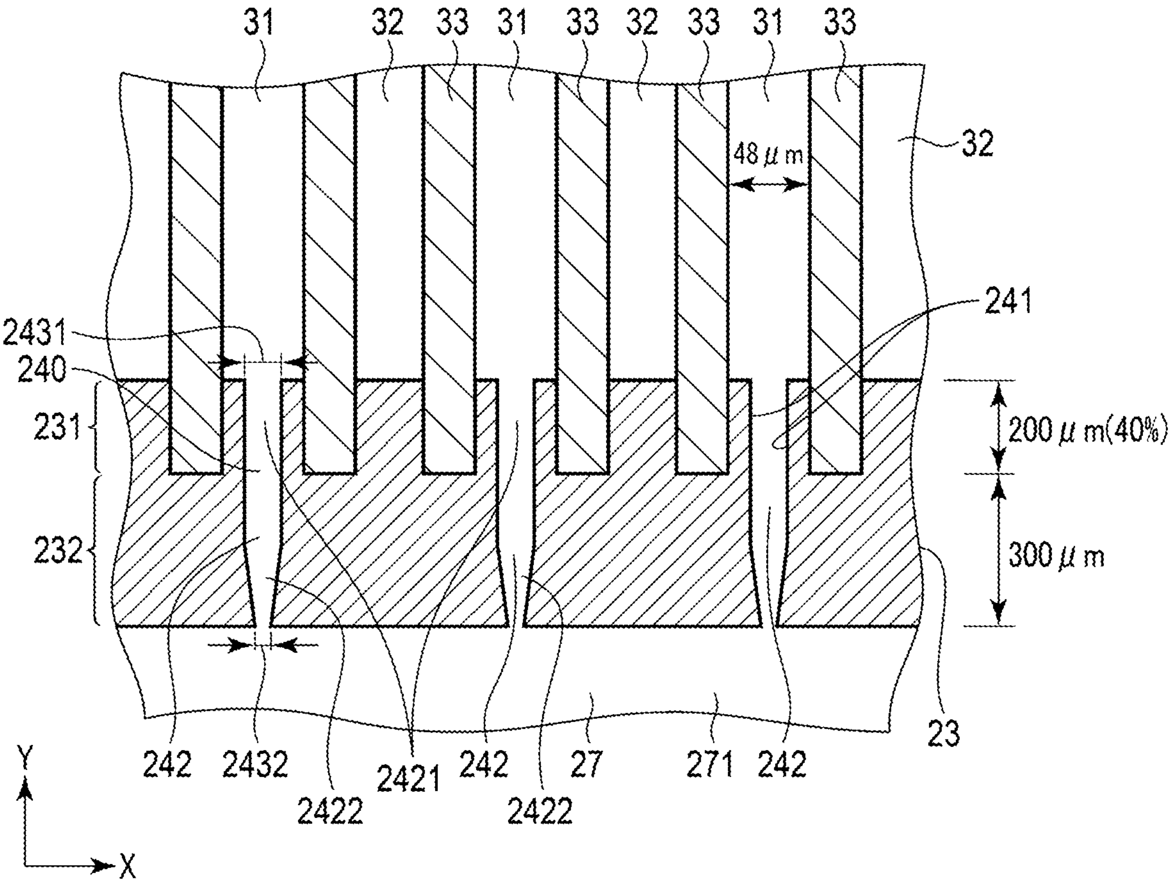
FIG. 6 is a diagram showing an aperture unit of an inkjet head according to Comparative Example 1.
Figure 8:
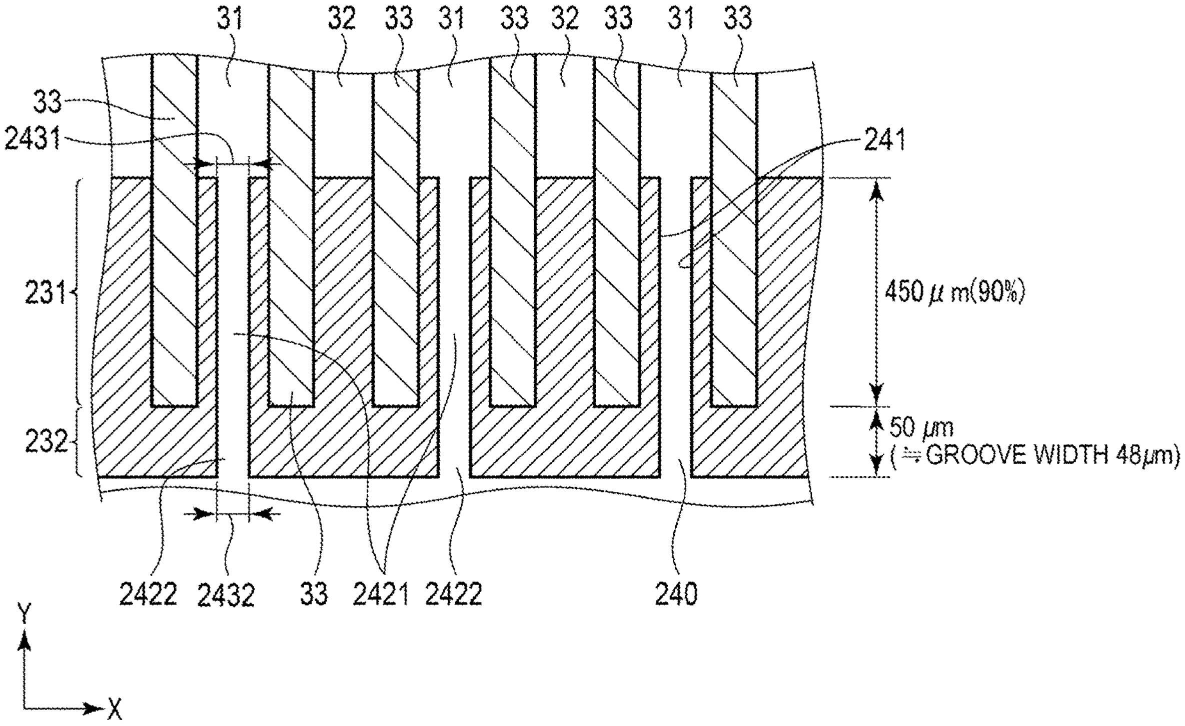
FIG. 8 is a diagram showing an aperture unit of an inkjet head according to Example 2.
Figure 9:
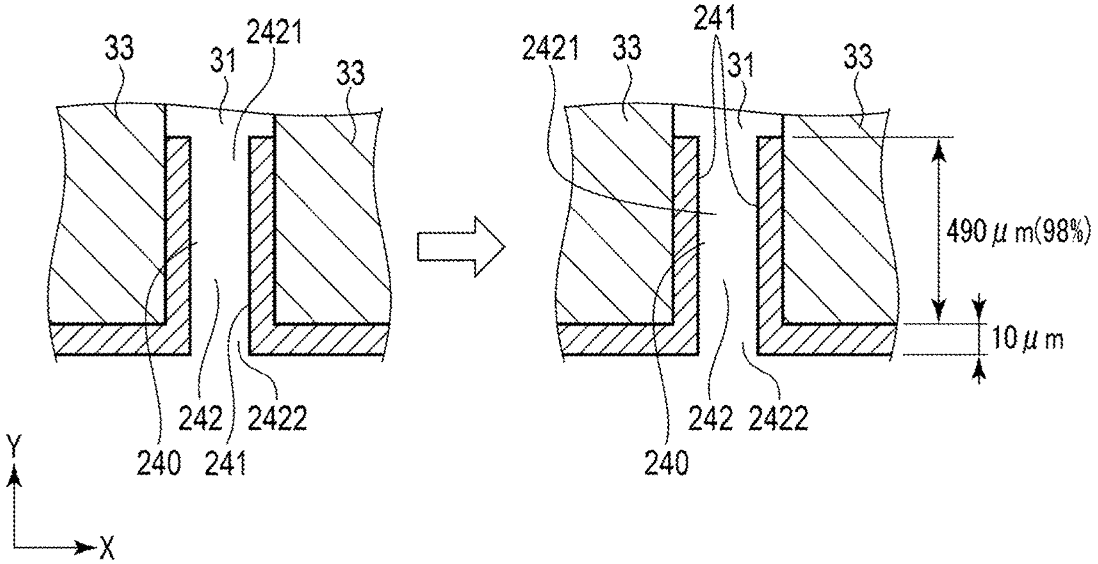
FIG. 9 is a diagram showing an aperture unit of an inkjet head according to Example 3.
Figure 10:
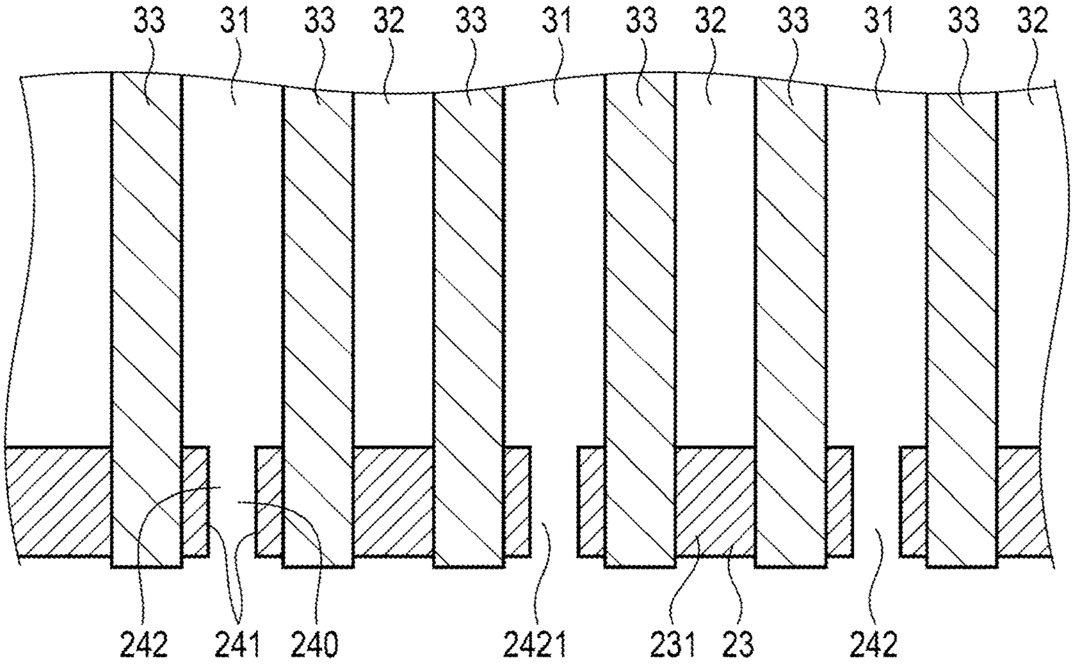
FIG. 10 is a diagram showing an aperture unit of an inkjet head according to Example 4.
Figure 11:
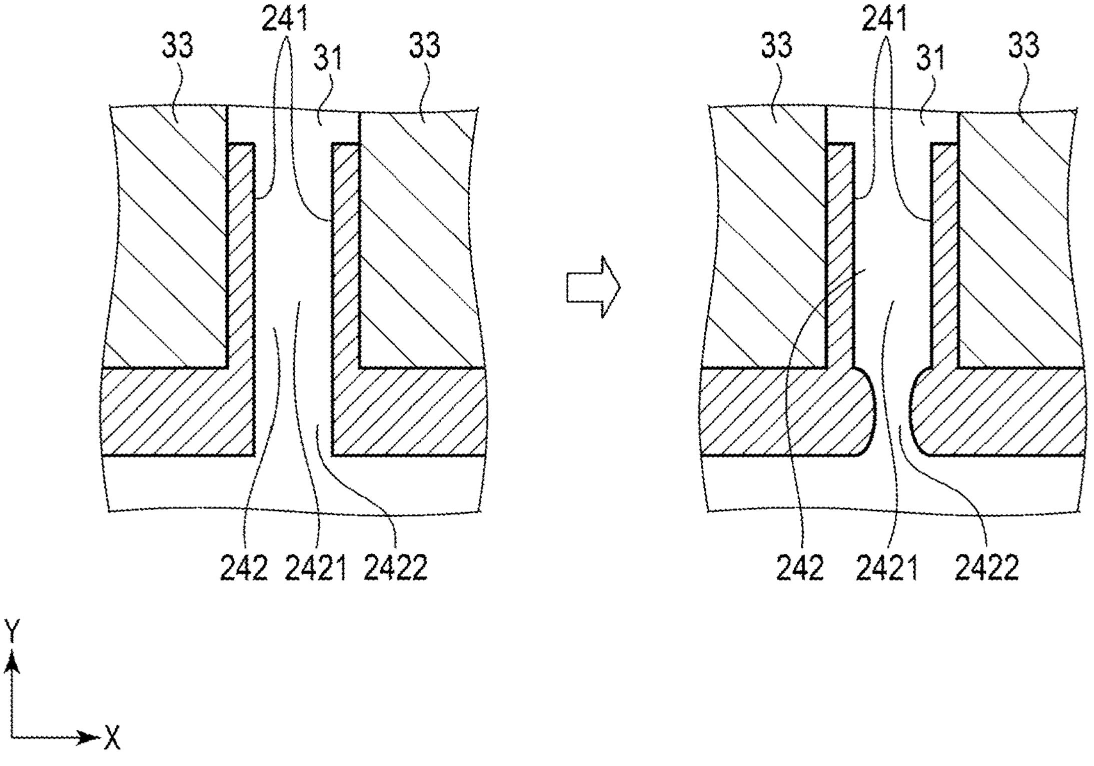
FIG. 11 is a diagram showing an aperture unit of an inkjet head according to Comparative Example 2.

Hereinafter, a configuration of an inkjet head 10 which is a liquid ejection head will be described with reference to FIGS. 1 to 11. FIG. 1 is a perspective view showing the inkjet head 10, and FIG. 2 is an exploded perspective view of a part of the inkjet head 10. FIGS. 3 and 4 are enlarged cross-sectional views showing a part the inkjet head 10. FIGS. 5 and 6 are diagrams of apertures of the inkjet head 10 according to Example 1 and an inkjet head according to Comparative Example 1, and FIG. 7 is a table showing the measured values of the apertures of Example 1 and Comparative Example 1. FIGS. 8-10 are an diagrams showing apertures according to Example 2, Example 3, and Example 4, respectively. FIG. 11 is a diagram showing an aperture unit according to Comparative Example 2. In this disclosure, the direction along which nozzles 28 and pressure chambers 31 of the inkjet head 10 are arranged is defined as the X axis, the extension direction of each pressure chamber 31 is defined as the Y axis, and the liquid ejection direction is defined as the Z axis for illustration purpose.

As shown in FIGS. 1 to 4, the inkjet head 10 is a so-called side shooter type, shear mode shared wall type inkjet head. The inkjet head 10 is a device for ejecting ink and is mounted inside, for example, an inkjet printer. For example, the inkjet head 10 is an independently driven inkjet head in which pressure chambers 31 and dummy chambers 32 are alternately arranged. The dummy chamber 32 is an air chamber to which ink is not supplied and does not communicate with any nozzle 28.

The inkjet head 10 includes an actuator base 11, a nozzle plate 12, and a frame 13. In the actuator base 11, an ink chamber 27 to which ink as an example of a liquid is supplied is formed inside the inkjet head 10.

Further, the inkjet head 10 includes parts such as a circuit board 17 that controls the inkjet head 10 and a manifold 18 that forms a part of a path between the inkjet head 10 and the ink tank.

As shown in FIG. 2, the actuator base 11 includes a substrate 21, a pair of actuator members 22, and a cover unit 23.

The substrate 21 is formed of ceramics such as alumina in a rectangular plate shape. The substrate 21 has a flat mounting surface. A pair of actuator members 22 are joined to the mounting surface of the substrate 21. A plurality of supply holes 25 and discharge holes 26 are formed on the substrate 21.

As shown in FIG. 2, a pattern wiring 211 is formed on the substrate 21 of the actuator base 11. The pattern wiring 211 is formed of, for example, a nickel thin film. The pattern wiring 211 has common patterns and individual patterns and is configured in a predetermined pattern shape connected to an electrode layer 34 formed on the actuator member 22.

The supply holes 25 are provided in the central portion of the substrate 21 between the pair of actuator members 22 side by side along the longitudinal direction of the actuator members 22. The supply hole 25 communicates with the ink supply portion of the manifold 18. The supply hole 25 is connected to the ink tank via the ink supply portion. Through the supply hole 25, the ink is supplied from the ink tank to the ink chamber 27.

The discharge holes 26 are provided side by side in two rows with the supply holes 25 and the pair of actuator members 22 interposed therebetween. The discharge hole 26 communicates with the ink discharge portion of the manifold 18. The discharge hole 26 is connected to the ink tank via the ink discharge portion. Through the discharge hole 26, the ink is discharged from the ink chamber 27 into the ink tank.

The pair of actuator members 22 adhere to the mounting surface of the substrate 21. The pair of actuator members 22 are provided on the substrate 21 side by side in two rows with the supply holes 25 interposed therebetween. Each actuator member 22 is formed of, for example, two plate-shaped piezoelectric bodies formed of lead zirconate titanate (PZT). The two piezoelectric bodies are bonded so that the polarization directions are opposite to each other in the thickness direction. The actuator member 22 is adhered to the mounting surface of the substrate 21 with, for example, a thermosetting epoxy adhesive. As shown in FIG. 2, the actuator members 22 are arranged side by side in parallel in the ink chamber 27 corresponding to the nozzles 28 arranged in two rows. The actuator member 22 divides the ink chamber 27 into a first common chamber 271 in which the supply hole 25 opens and two second common chambers 272 in which the discharge hole 26 opens.

The pair of actuator members 22 are arranged along the longitudinal direction (first direction), and an orthogonal cross section is formed in a trapezoidal shape. The side surface portion 221 of the actuator member 22 has an inclined surface that is inclined with respect to the second direction (Y-axis direction) and the third direction (Z-axis direction). That is, the actuator member 22 is configured to have a trapezoidal shape in the cross-sectional view orthogonal to the second direction. The top of the actuator member 22 adheres to the nozzle plate 12. The actuator member 22 includes a plurality of pressure chambers 31 and a plurality of dummy chambers 32. The actuator member 22 includes a plurality of sidewalls 33 and includes grooves forming the pressure chamber 31 and the dummy chamber 32 between the sidewalls 33. In other words, the sidewall 33 operates as a driving element between the grooves forming the pressure chamber 31 and the dummy chamber 32. The plurality of pressure chambers 31 and the dummy chamber 32 are composed of grooves that open at both ends in the second direction and on one side in the third direction.

As shown in FIGS. 1 to 4, a bottom surface portion of the groove and the main surface of the substrate 21 are connected by the inclined side surface portion 221. The pressure chambers 31 and the dummy chambers 32 are alternately placed. The pressure chambers 31 and the dummy chambers 32 extend in a direction intersecting the longitudinal direction of the actuator member 22 (X-axis in the drawings) and are arranged in parallel along the longitudinal direction of the actuator member 22.

The shape of the pressure chamber 31 and the shape of the dummy chamber 32 may be different. The sidewall 33 is formed between the pressure chamber 31 and the dummy chamber 32 and deforms in response to a drive signal to change the volume of the pressure chamber 31.

The plurality of pressure chambers 31 communicate with the plurality of nozzles 28 of the nozzle plate 12 joined to the top thereof. Both ends of the pressure chamber 31 in the second direction communicate with the ink chamber 27. That is, one end opens to the first common chamber 271 of the ink chamber 27, and the other end opens to the second common chamber 272 of the ink chamber 27. Therefore, the ink flows in from one end of the pressure chamber 31, and the ink flows out from the other end. At both ends of the pressure chamber 31, aperture units 240 having a fluid resistance larger than the inside of the pressure chamber 31 are formed.

The dummy chamber 32 is closed by the nozzle plate 12 having one side joined to the top 222 in the third direction. Further, both ends of the plurality of dummy chambers 32 in the second direction are closed (blocked) by the cover unit 23, for example. That is, the cover units 23 are arranged between the first common chamber 271 and one end of the dummy chamber 32 of the ink chamber 27, and between the other end of the dummy chamber 32 and the second common chamber 272, respectively, and both ends of the dummy chamber 32 are separated from the ink chamber 27. Therefore, the dummy chamber 32 forms an air chamber in which ink does not flow in.

The electrode layer 34 is provided in each of the pressure chambers 31 and the dummy chambers 32 of the actuator base 11. The electrode layer 34 is formed of, for example, a nickel thin film. The electrode layer 34 reaches from the inner surface of the groove onto the substrate 21 and is connected to the pattern wiring 211. The electrode layer 34 is formed on the inner wall of the groove. For example, the electrode layer 34 is formed on the side surface portion and the bottom surface portion of the sidewall 33.

The cover units 23 are provided at both ends in the second direction of the grooves forming the plurality of pressure chambers 31 and the dummy chamber 32. The cover unit 23 is made of, for example, a photosensitive resin. The cover unit 23 is a cover formed in a predetermined shape having a slit-shaped opening by being exposed and developed after the film of the photosensitive resin is formed, or by being exposed, developed, and machined after the film of the photosensitive resin is formed. That is, on the inner surface of the sidewall 33 on the pressure chamber side, which forms both side surfaces of the pressure chamber 31, a protrusion protruding toward the pressure chamber side is formed.

The cover unit 23 is configured in a predetermined shape to close both ends of the groove forming the dummy chamber 32 and a part of both ends of the groove forming the pressure chamber 31 by performing a developing process in which photosensitive resin is applied to the inlets on both sides of the pressure chamber 31, the target portion is cured by exposure, and unnecessary unexposed resin is washed away with a developing solution.

The cover unit 23 includes a plurality of protrusions 241 that close the ends of the dummy chamber 32 in the second direction and are formed on both side surfaces in the first direction of each end of the pressure chamber 31 in the second direction. The protrusions 241 are formed on both side surfaces of the pressure chamber 31, for example.

The pair of protrusions 241 formed at the end of each pressure chamber 31 may be formed over the entire length in the third direction, which is the depth direction of the groove of the pressure chamber 31, or may be partially formed in the third direction. For example, each of the pair of protrusions 241 is formed in a rectangular shape long in the third direction.

The protrusion 241 forms the aperture unit 240 that has a fluid resistance larger than the inside of the pressure chamber by narrowing the opening of the pressure chamber 31.

That is, the groove forming the pressure chamber 31 is not completely covered by the protrusions 241, and an aperture 242 that communicates the pressure chamber 31 with the first common chamber 271 and the second common chamber 272 between the pair of protrusions 241 is formed. The aperture 242 has a slit shape extending in the third direction, which is the depth direction of the pressure chamber 31 and is configured to be smaller than the flow path cross-sectional area of the pressure chamber 31 by the opening width in the first direction being smaller than the width inside the pressure chamber 31 in the first direction. That is, the protrusion 241 partially closes the communication ports at both ends in the second direction to form the aperture unit 240 in which the flow path resistance increases. The aperture unit 240 is formed by being exposed and developed after the film of the photosensitive resin is formed, or by being exposed, developed, and machined after the film of the photosensitive resin is formed. For example, the aperture unit 240 is configured in a predetermined shape by performing a developing process in which a photosensitive resin is applied to the inlets on both sides of the pressure chamber 31, the target portion forming the protrusion 241 is cured by exposure, and unnecessary unexposed resin is washed away with a developing solution. Alternatively, the aperture 242 may be formed by applying a photosensitive resin to the pressure chamber 31, the photosensitive resin at predetermined positions of the communication ports on both sides is cured by the exposure process and development process, and then machining such as dicing is performed.

If the fluid resistance of the aperture unit 240 is too large, the replenishment of ink to the pressure chamber 31 after ink droplet ejection is delayed, which hinders high speed. Further, the rise of the meniscus differs depending on the ink viscosity, the ejection volume, the drive frequency, and the like. Therefore, the shape of the protrusion 241 and the dimension and position of the aperture 242 of the aperture unit 240 are set to have a flow path resistance according to the ink replenishment condition and the characteristics of the rise of the meniscus.

The cover unit 23 includes a first portion 231 formed in a gap between the sidewalls 33, and a second portion 232 located outside the pressure chamber 31 from the sidewall 33 in the second direction. That is, the aperture 242 formed by the protrusion 241 formed as a part of the cover unit 23 integrally has the first portion 2421 on the sidewall 33 and the second portion 2422 extending to the outside of the pressure chamber 31 in the second direction from the sidewall 33. Here, the dimensions of the cover unit 23, the protrusions 241, and the aperture 242 in the second direction are such that the portion on or between the sidewalls 33 is longer than the portion formed on the outside of the sidewalls 33.

In Example 1, the first portion 231 is configured to be larger than the second portion 232 in the second direction. That is, 50% or more of the cover unit 23 in the thickness direction or the second direction are between the sidewalls 33. The dimension of the first portion 2421 of the protrusion 241 in the second direction is 50% or more of the total length of the protrusion 241 in the second direction. That is, the length of the first portion is longer than that of the second portion. In other words, the dimension of the first portion 2421 of the aperture 242 in the second direction, which is the flow path length of the aperture 242 composed of the protrusion 241 is 50% or more of the total length of the aperture 242 in the second direction. That is, the length of the first portion 2421 is longer than that of the second portion 2422.

FIG. 5 is a diagram showing the aperture unit 240 according to Example 1, and FIG. 6 is a diagram showing the aperture unit 240 according to Comparative Example 1. FIG. 7 is a table showing the dimension of the width "a" at the outlet 2431 on the pressure chamber 31 side, which is the inside of the aperture 242, and the dimension of the width "b" at the inlet 2432 on the ink chamber 27 side, which is the outside of the aperture 242, in the design values for Example 1 and Comparative Example 1. In FIG. 7, in five different pressure chambers 31 according to Example 1 and Comparative Example 1, the measured values of the width "a" and the width "b," the average value, and the standard deviation are shown. Both Example 1 and Comparative Example 1 show the measured values in the five pressure chambers 31 if a slit, which becomes the aperture 242, is formed by dicing after the cover unit 23 is applied. In both Example 1 and Comparative Example 1, the design values are set for the aperture length, that is, the total length of the aperture 242 in the second direction to be 500 μm, for the aperture width, that is, the dimension of the slit which is the aperture 242 in the first direction to be 28 μm, and for the width of the groove, that is, the dimension of the pressure chamber 31 in the first direction to be 48 μm.

In Example 1, the lengths of the first portion 231 and the second portion 232 are set to 50% of the aperture length in the second direction. In Example 1, the width "a" of the aperture 242 inside the pressure chamber 31 was 27.98 μm on average, and the standard deviations of the widths of the openings inside and outside the aperture unit 240 were about 0.13 and 0.16.

In Comparative Example 1, the lengths of the first and second portions 231 and 232 are set to 40% and 60% of the aperture length in the second direction. In Comparative Example 1, the width "a" of the aperture 242 inside the pressure chamber 31 was 27.94 μm on average, and the width "b" of the aperture 242 outside of the pressure chamber 31 was 25.36 μm on average. Further, the standard deviations of the width dimensions of the openings inside and outside the aperture unit 240 were 0.11 and 0.33. As shown in FIG. 7, in the case of Comparative Example 1, the widths of the slit as the aperture 242 formed by machining are greatly different between the first portion 2421 on the sidewall 33 and the second portion 2422 formed outside the sidewall 33, and the variation in the width dimension of the outer inlet 2432 for each pressure chamber 31 becomes particularly large.

FIG. 8 is a diagram showing the aperture unit 240 according to Example 2. In Example 2, the design values are set for the aperture length, that is, the total length of the aperture 242 in the second direction to be 500 μm, for the aperture width, that is, the dimension of the slit-shaped aperture 242 in the first direction to be 28 μm, and for the width of the pressure chamber 31, that is, the dimension of the pressure chamber 31 in the first direction to be 48 μm. For example, in Example 2, 80% or more of the total thickness, which is the dimension of the cover unit 23 in the second direction, is configured to be between the sidewalls 33. That is, in the aperture 242 composed of the protrusion 241, the dimension of the first portion 2421 is 80% or more of the total length of the aperture 242 in the second direction. Further, in Example 2, the dimension of the second portion in the second direction is based on the width dimension of the pressure chamber 31 in the first direction so that the thickness of the second portion in the second direction is the same as or less than the width dimension of the pressure chamber 31 in the first direction, or equal to or less than the width dimension of the pressure chamber 31 in the first direction, and the width dimension of the first portion 2421 is set to be 80% or more of the total length of the aperture 242 in the second direction.

FIG. 9 is a diagram showing the aperture unit 240 according to Example 3. In Example 3, the design value is set for the aperture length, that is, the total length of the aperture 242 in the second direction to be 500 μm, for the aperture width, that is, the dimension of the slit forming the aperture 242 in the first direction to be 28 μm, and for the width of the groove, that is, the dimension of the pressure chamber 31 in the first direction to be 48 μm. For example, in Example 3, 95% or more of the total thickness, which is the dimension of the cover unit 23 in the second direction, is set as the first portion 231 on the sidewall 33. That is, in the aperture 242 composed of the protrusion 241, the dimension of the first portion 2421 is set to 95% or more of the total length of the aperture 242 in the second direction. In Example 3, the dimension of the second portion 2422 in the second direction is equal to or less than the thickness of the protrusion 241 formed on the sidewall 33, that is, the thickness dimension of the protrusion 241 in the first portion 2421 in the first direction. In the present example, the thickness in the pressure chamber 31 is 10 μm, which is (groove width 48 μm−slit width 28 μm)/2. The length of the first portion 2421 is 490 μm, that is, 98% of the total length. In this example, based on this thickness, the thickness of the second portion 232 in the second direction is set to be equal to or less than the thickness of the first portion 231 in the pressure chamber 31 or to be equal to or less than the thickness. As an example, the thickness of the second portion 232 in the second direction is set to be the thickness of the thinnest portion or less, or equal to or less than the thickness of the thinnest portion based on that of the thinnest portion among the thickness of the bottom surface portion and the side surface portion in the pressure chamber 31 of the first portion 231. In the present example, the dimension of the first portion 2421 is set to be 95% or more of the total length of the aperture 242 in the second direction.

FIG. 10 is a diagram showing the aperture unit 240 according to Example 4. In Example 4, the design values are set for the aperture length, that is, the total length of the aperture 242 in the second direction to be 500 μm, for the aperture width, that is, the dimension of the slit forming the aperture 242 in the first direction to be 28 μm, and for the width of the groove, that is, the dimension of the pressure chamber 31 in the first direction to be 48 μm. In Example 4, the entire cover unit 23 and protrusion 241 are formed to be in the space between the sidewalls 33 or the inner wall of the sidewall 33. That is, there is no second portion 232. In the present example, 100% of the total thickness of the cover unit 23 is the first portion 231.

The nozzle plate 12 is formed of, for example, a rectangular film made of polyimide. The nozzle plate 12 faces the mounting surface of the actuator base 11. A plurality of nozzles 28 are formed in the nozzle plate 12 to penetrate the nozzle plate 12 in the thickness direction.

A plurality of nozzles 28 are provided in the same number as the pressure chambers 31 and are arranged to face the pressure chambers 31. A plurality of nozzles 28 are arranged along the first direction and are arranged in two rows corresponding to the pair of actuator members 22. Each nozzle 28 is configured in a cylindrical shape whose axis extends in the third direction. For example, the nozzle 28 may have a constant diameter or may have a shape in which the diameter is reduced toward the central portion or the tip portion. The nozzles 28 are arranged to face the extension direction of the corresponding pressure chambers 31 formed in the pair of actuator members 22 and communicate with the pressure chambers 31. One nozzle 28 is arranged in the central portion of each pressure chamber 31 in the longitudinal direction.

The frame 13 is formed of, for example, a nickel alloy in a rectangular frame shape. The frame 13 is interposed between the mounting surface of the actuator base 11 and the nozzle plate 12. The frame 13 is adhered to the mounting surface of the actuator base 11 and the nozzle plate 12. That is, the nozzle plate 12 is attached to the actuator base 11 via the frame 13.

The manifold 18 is joined to the actuator base 11 on the side on which the nozzle plate 12 is not joined. Inside the manifold 18, an ink supply portion, which is a flow path communicating with the supply hole 25, and an ink discharge portion, which is a flow path communicating with the discharge hole 26, are formed.

The circuit board 17 is a film carrier package (FCP). The circuit board 17 includes a resin film 51 having flexibility and a plurality of wirings formed therein, and drive IC chips 52 connected to the plurality of wirings of the film 51. Each drive IC chip 52 is electrically connected to the electrode layer 34 via the wiring of the film 51 and the pattern wiring 211.

Inside the inkjet head 10 configured as described above, the ink chamber 27 surrounded by the actuator base 11, the nozzle plate 12, and the frame 13 is formed. That is, the ink chamber 27 is formed between the actuator base 11 and the nozzle plate 12. For example, the ink chamber 27 is divided into three sections in the second direction by the two actuator members 22, and includes the two second common chambers 272 as common chambers in which the discharge holes 26 open, and the first common chamber 271 as a common chamber in which the supply holes 25 open. The first common chamber 271 and the second common chambers 272 communicate with the pressure chambers 31.

In the inkjet head 10 configured as described above, ink circulates between the ink tank and the ink chamber 27 through the supply hole 25, the pressure chamber 31, and the discharge hole 26. For example, the drive IC chip 52 applies a drive voltage to the electrode layer 34 of the pressure chamber 31 via the wiring of the film 51 in response to a signal input from the controller of the inkjet printer to create a potential difference between the electrode layer 34 of the pressure chamber 31 and the electrode layer 34 of the dummy chamber 32, whereby the sidewalls 33 are selectively deformed in the shear mode. The volume of the pressure chamber 31 is changed by deforming the sidewall 33 formed between the pressure chamber 31 and the dummy chamber 32 in response to the drive signal.

If the sidewall 33 is deformed in the shear mode, the volume of the pressure chamber 31 provided with the electrode layer 34 increases, and the pressure decreases. As a result, the ink in the ink chamber 27 flows into the pressure chamber 31.

With the volume of the pressure chamber 31 increased, the drive IC chip 52 applies a reverse potential drive voltage to the electrode layer 34 of the pressure chamber 31. As a result, the sidewall 33 is deformed in the shear mode, the volume of the pressure chamber 31 provided with the electrode layer 34 is reduced, and the pressure increases. As a result, the ink in the pressure chamber 31 is pressurized and ejected from the nozzle 28.

The manufacturing method of the inkjet head 10 will be described. First, a piezoelectric member forming a plurality of grooves is attached to the plate-shaped substrate 21 with an adhesive or the like, and machined using a dicing saw, a slicer, or the like to form the actuator member 22 having an outer shape in a predetermined shape. For example, a block-shaped base member having a thickness corresponding to a plurality of sheets may be formed in advance and then divided to manufacture a plurality of actuator bases 11 having a predetermined shape.

Subsequently, the electrode layer 34 and the pattern wiring 211 are formed on the inner surface of the groove forming the pressure chamber 31 and the dummy chamber 32, and the surface of the substrate 21. As described above, the electrode layer 34 and the pattern wiring 211 are formed at predetermined positions on the surface of the actuator base 11. Subsequently, the cover unit 23 is formed of the photosensitive resin. For example, the cover unit 23 is formed by a filling process of filling the communication ports which are the inlets and outlets on both sides of the groove constituting the dummy chamber 32 and the pressure chamber 31 with a photosensitive resin material and closing the communication ports at both ends with the photosensitive resin, and a molding process for molding the photosensitive resin into a predetermined shape. As an example, the aperture 242 having a predetermined shape is opened by a developing process in which after a photosensitive resin material is filled in the communication ports on both sides of the grooves constituting the dummy chamber 32 and the pressure chamber 31, an exposure mask having an exposure pattern in which a portion forming an opening to be the aperture 242 is uncured is overlapped and exposed to cure the portion other than the portion not to be cured which becomes the aperture 242, and the uncured portion is washed away with a developing solution. As a result, the photosensitive resin material is formed into a predetermined shape, and the aperture unit 240 is formed. That is, the cover unit 23 having a pair of protrusions 241 with the aperture 242 formed therebetween is formed.

Further, as another example, if sufficient resolution cannot be obtained by forming an aperture pattern of a photosensitive resin by exposure depending on the conditions, the aperture 242 may be formed by machining to form the protrusion 241. As the filling treatment, the photosensitive resin material is applied and filled in both ends of the dummy chamber 32 and the pressure chamber 31, and the filled photosensitive resin material is cured by the exposure treatment and the development treatment to close the communication ports of the dummy chamber 32 and the pressure chamber 31 with a wall of a photosensitive resin, and then the aperture 242 is formed by machining using a dicer having a desired width as a molding process. As a result, the cover unit 23 having the protrusion 241 having a predetermined shape is formed.

Further, the actuator base 11 is assembled to the manifold 18, and the frame 13 is attached to one surface of the substrate 21 of the actuator base 11 with an adhesive sheet of thermoplastic resin.

Then, the assembled frame 13, the top 222 of the sidewall 33 of the actuator member 22, and the facing surface of the protrusion 241 facing the nozzle plate 12 are polished to be flush with each other. Then, the nozzle plate 12 is adhered and attached to the top 222 of the sidewall 33, the frame 13, and the facing surface of the protrusion 241, which were polished. At this time, positioning is performed so that the nozzle 28 faces the pressure chamber 31. Further, as shown in FIG. 1, the inkjet head 10 is completed by connecting the drive IC chip 52 and the circuit board 17 to the pattern wiring 211 formed on the main surface of the substrate 21 via the flexible printed circuit board.

Hereinafter, an example of the inkjet printer 100 including the inkjet head 10 will be described with reference to FIG. 21. The inkjet printer 100 includes a housing 111, a medium supply unit 112, an image forming unit 113, a medium discharge unit 114, a conveyer 115, and a controller 116.

The inkjet printer 100 is a liquid ejection device that performs image forming processing on paper P by ejecting a liquid such as ink or the like while conveying, for example, paper P as a recording medium which is an ejection target, along a predetermined conveyance path A from the medium supply unit 112 to the medium discharge unit 114 through the image forming unit 113.

The housing 111 houses the components of the inkjet printer 100. A discharge port for discharging the paper P to the outside is provided at a predetermined position on the housing 111.

The medium supply unit 112 is provided with a plurality of paper feed cassettes and is configured to be able to hold a plurality of sheets P of various sizes.

The medium discharge unit 114 includes a sheet discharge tray configured to hold the paper P discharged from the discharge port.

The image forming unit 113 includes a support unit 117 that supports the paper P, and a plurality of head units 130 that are arranged to face the support unit 117 above the support unit 117.

The support unit 117 includes a conveying belt 118 provided in a loop shape in a predetermined area for image formation, a support plate 119 that supports the conveying belt 118 from the backside, and a plurality of belt rollers 120 provided on the backside of the conveying belt 118.

At the time of image formation, the support unit 117 supports the paper P on the holding surface which is the upper surface of the conveying belt 118, and feeds the conveying belt 118 at a predetermined timing by the rotation of the belt roller 120 to convey the paper P to the downstream side.

The head unit 130 includes a plurality of (e.g., four color) inkjet heads 10, an ink tank 132 as a liquid tank mounted on each inkjet head 10, a connection flow path 133 connecting the inkjet head 10 and the ink tank 132, and a circulation pump 134. The head unit 130 is a circulation-type head unit that constantly circulates liquid in the ink tank 132, the pressure chamber 31, the dummy chamber 32, and the ink chamber 27, built inside the inkjet head 10.

Figure 21:
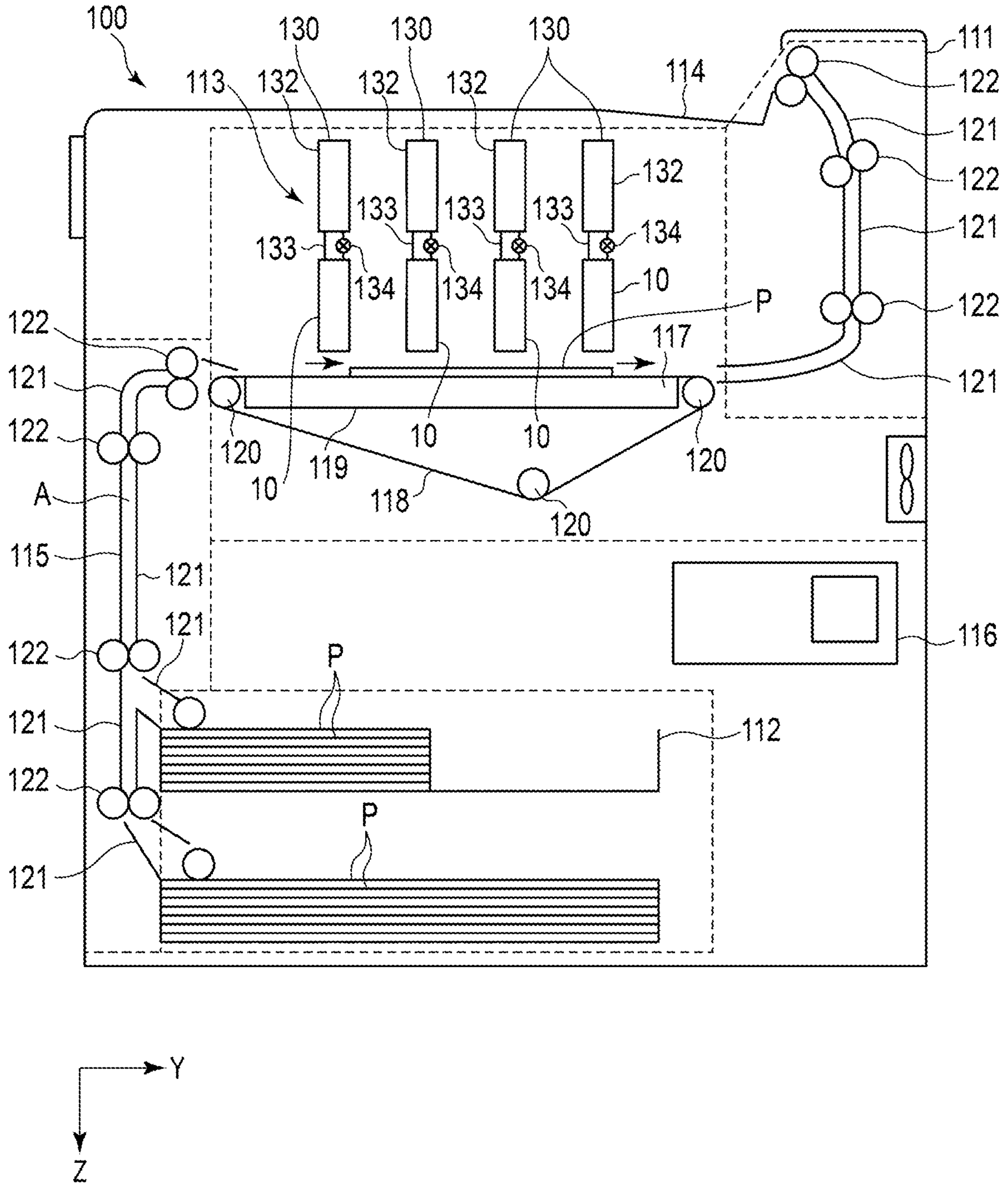
FIG. 21 is a schematic diagram showing an inkjet printer according to an embodiment.

In the example of FIG. 21, the inkjet head 10 of four colors of cyan, magenta, yellow, and black, and the ink tank 132 for storing the ink of each color are provided. The ink tank 132 is connected to the inkjet head 10 by the connection flow path 133. The connection flow path 133 includes a supply flow path connected to the supply port of the inkjet head 10 and a collection flow path connected to the discharge port of the inkjet head 10.

Further, a negative pressure control device such as a pump (not shown) is connected to the ink tank 132. Then, the negative pressure control device applies to the inside of the ink tank 132 a negative pressure corresponding to the head values of the inkjet head 10 and the ink tank 132, so that the ink supplied to each nozzle 28 of the inkjet head 10 forms a meniscus in a predetermined shape.

The circulation pump 134 is a liquid feed pump composed of, for example, a piezoelectric pump. The circulation pump 134 is provided in the supply flow path. The circulation pump 134 is connected to the drive circuit of the controller 116 by wiring and is configured to be controllable by the control by a Central Processing Unit (CPU). The circulation pump 134 circulates the liquid in a circulation flow path including the inkjet head 10 and the ink tank 132.

The conveyer 115 conveys the paper P along the conveyance path A from the medium supply unit 112 to the medium discharge unit 114 through the image forming unit 113. The conveyer 115 includes a plurality of guide plate pairs 121 arranged along the conveyance path A, and a plurality of conveying rollers 122.

Each of the plurality of guide plate pairs 121 includes a pair of plate members arranged to face each other with the paper P to be conveyed interposed therebetween, and guides the paper P along the conveyance path A.

The conveying roller 122 is driven by the controller 116 and rotates to feed the paper P to the downstream side along the conveyance path A. Sensors for detecting the sheet conveyance status are arranged in various places on the conveyance path A.

The controller 116 includes a processor such as a CPU, a Read Only Memory (ROM) that stores various programs, a Random Access Memory (RAM) that temporarily stores various variable data and image data, and a network interface circuit for inputting data from the outside and outputting data to the outside.

In the inkjet printer 100 configured as described above, if a print instruction is detected by the operation through the operation input unit by the user, for example, the controller 116 drives the conveyer 115 to convey the paper P and outputs a print signal to the head unit 130 at the predetermined timing, thereby driving the inkjet head 10. As an ejection operation, the inkjet head 10 sends a drive signal to the IC by an image signal corresponding to the image data, applies a drive voltage to the electrode layer 34 of the pressure chamber 31 via wiring, selectively drives the sidewalls 33 of the actuator member 22, ejects ink from the nozzle 28 to form an image on the paper P held on the conveying belt 118. Further, as a liquid ejection operation, the controller 116 drives the circulation pump 134 to circulate the liquid in the circulation flow path passing through the ink tank 132 and the inkjet head 10. By the circulation operation, the circulation pump 134 is driven so that the ink in the ink tank 132 passes through the ink supply portion of the manifold 18 and supplied to the first common chamber 271 of the ink chamber 27 from the supply hole 25. This ink is supplied to the plurality of pressure chambers 31 and the plurality of dummy chambers 32, of the pair of actuator members 22. The ink flows into the second common chamber 272 of the ink chamber 27 through the pressure chamber 31 and the dummy chamber 32. This ink is discharged from the discharge hole 26 to the ink tank 132 through the ink discharge portion of the manifold 18.

According to the above-described examples, it is possible to provide a liquid ejection head and a method for manufacturing a liquid ejection head with stable ejection characteristics. That is, in the inkjet head 10 according to the above examples, by providing the cover unit 23 in the pressure chamber 31, the flow path resistance of the inlet and outlet of the pressure chamber 31 is larger than those of the inside of the pressure chamber 31, the first common chamber 271, and the second common chamber 272. As a specific example, the opening that opens into the first common chamber 271 and the second common chamber 272, which are the common chambers of the pressure chamber 31, has a flow path cross-sectional area smaller than that of the pressure chamber 31. Therefore, the rise of the meniscus if the liquid is ejected by the inkjet head 10 is reduced. Therefore, the meniscus returns quickly, the influence on the next droplet can be reduced, and the ejection stability can be improved.

Figure 12A:
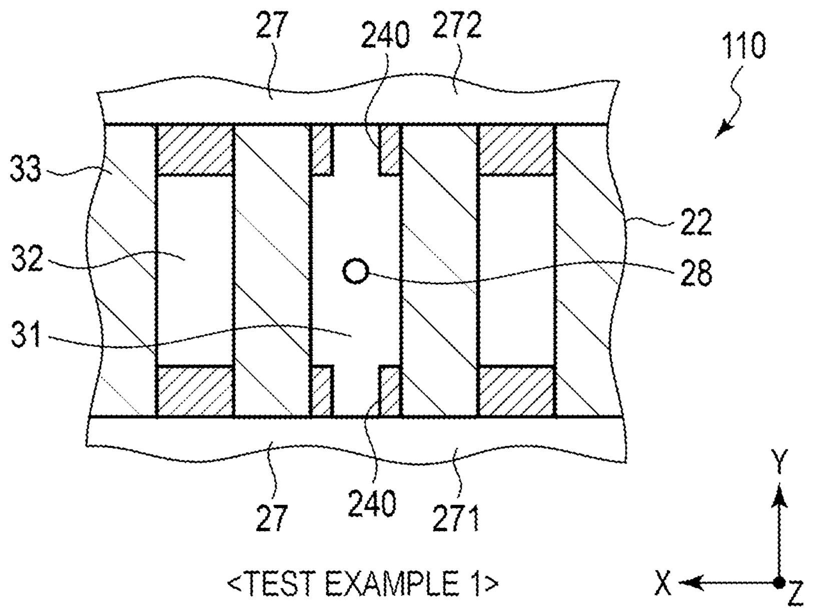
FIGS. 12A and 12B are diagrams of inkjet heads according to Test Example 1 and Test Example 2.
Figure 12B:
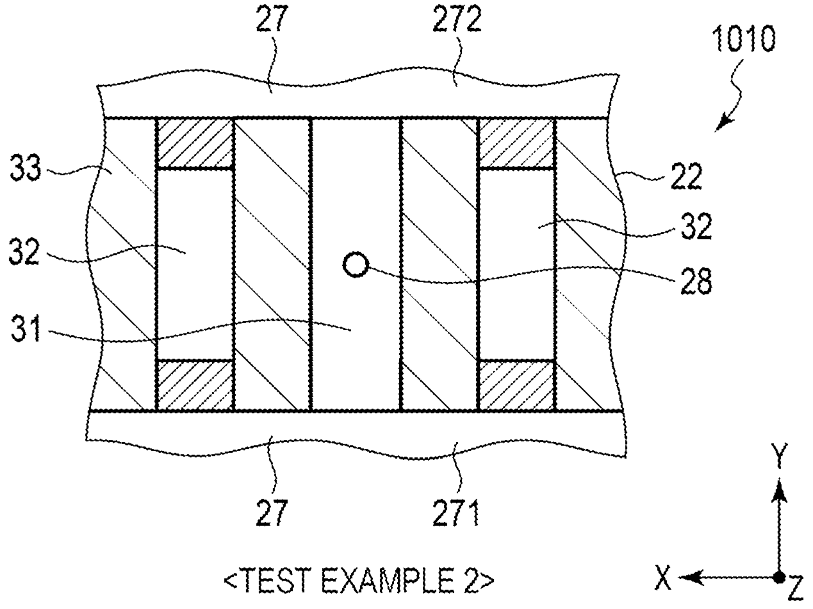
Figure 13:
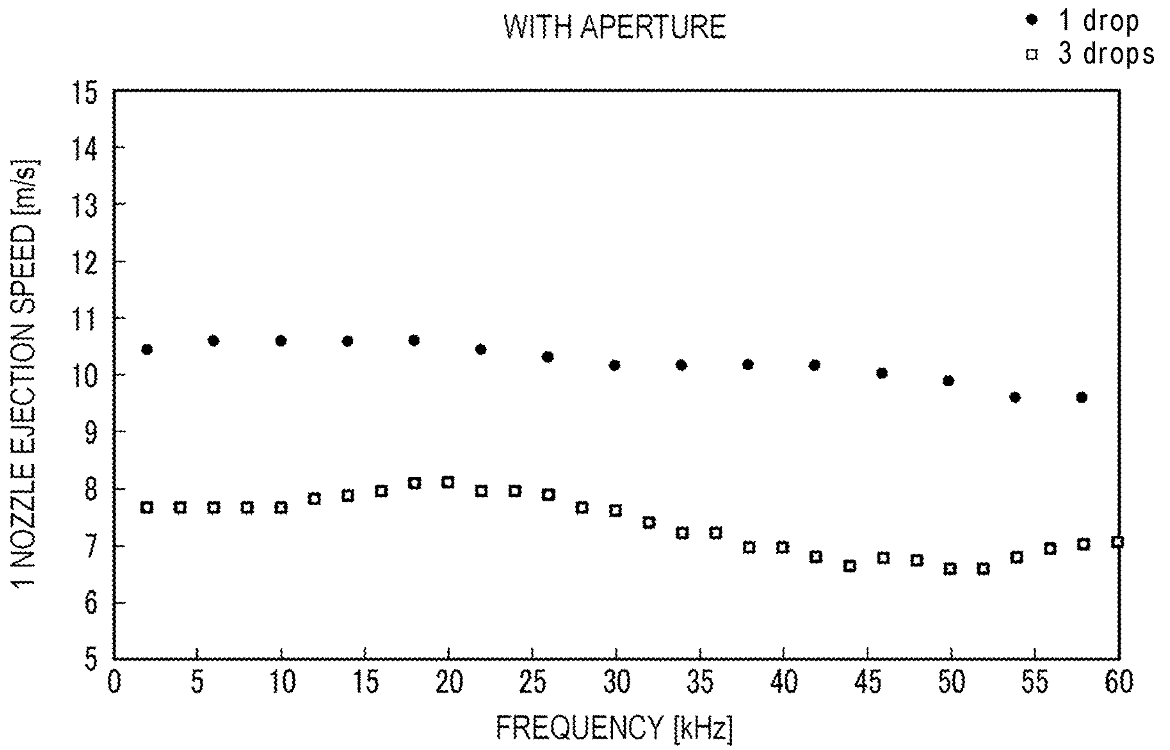
FIG. 13 is a graph showing the ejection speed of an inkjet head according to Test Example 1.
Figure 14:
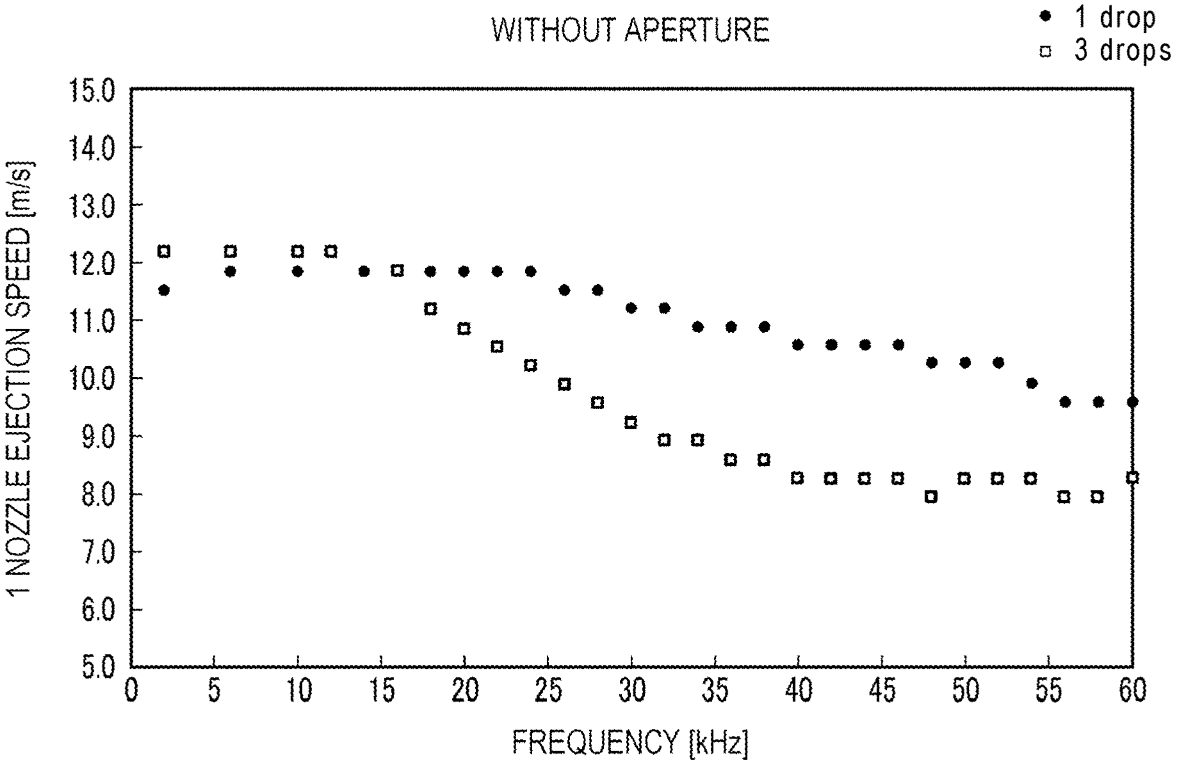
FIG. 14 is a graph showing the ejection speed of an inkjet head according to Test Example 2.

FIGS. 12A and 12B show the inkjet head 110 having the aperture unit 240 according to Test Example 1 and the inkjet head 1010 having no aperture according to Test Example 2. FIG. 13 shows the frequency characteristics of the inkjet head 110 having the aperture unit 240 according to Test Example 1, and FIG. 14 shows the frequency characteristics of the inkjet head 1010 having no aperture as Test Example 2. FIGS. 13 and 14 show the relationship between the ejection speed of each nozzle and the frequency in the cases in which 1 drop and 3 drops are ejected at once, respectively.

The inkjet head 110 according to Test Example 1 is a side shooter type in which both sides of the pressure chamber 31 in the second direction, which is the extension direction, communicate with the common chamber, and the nozzle 28 opens in the middle of the extension direction of the pressure chamber 31.

As shown in FIG. 14, in the inkjet head 1010 according to Test Example 2, the ejection speed is flat in the low frequency region, but the ejection speed tends to decrease as the frequency increases, and there is a difference in ejection speed between the low frequency region and the high frequency region. In the case in which 1 drop is ejected by the inkjet head 1010 according to Test Example 2, the ejection speed is flat up to 25 kHz, but the ejection speed tends to decrease as the frequency increases at 25 kHz or higher. Further, in the case in which 3 drops are ejected by the inkjet head 1010 according to Test Example 2, the ejection speed is flat up to 15 kHz, but the ejection speed tends to decrease as the frequency increases at 15 kHz or higher. Therefore, the landing position shifts depending on the printing pattern. If the difference in ejection speed is large as described above, it takes time for the rise of the meniscus to settle, which causes deterioration of print quality, and therefore high-speed driving cannot be performed.

On the other hand, as shown in FIG. 13, in the inkjet head 110 having the aperture unit 240, the ejection speed tends to be flat in both cases of 1 drop and 3 drops. This is because the fluid resistance between the common liquid and the nozzle increases, and the rise of the meniscus decreases.

Figure 15:
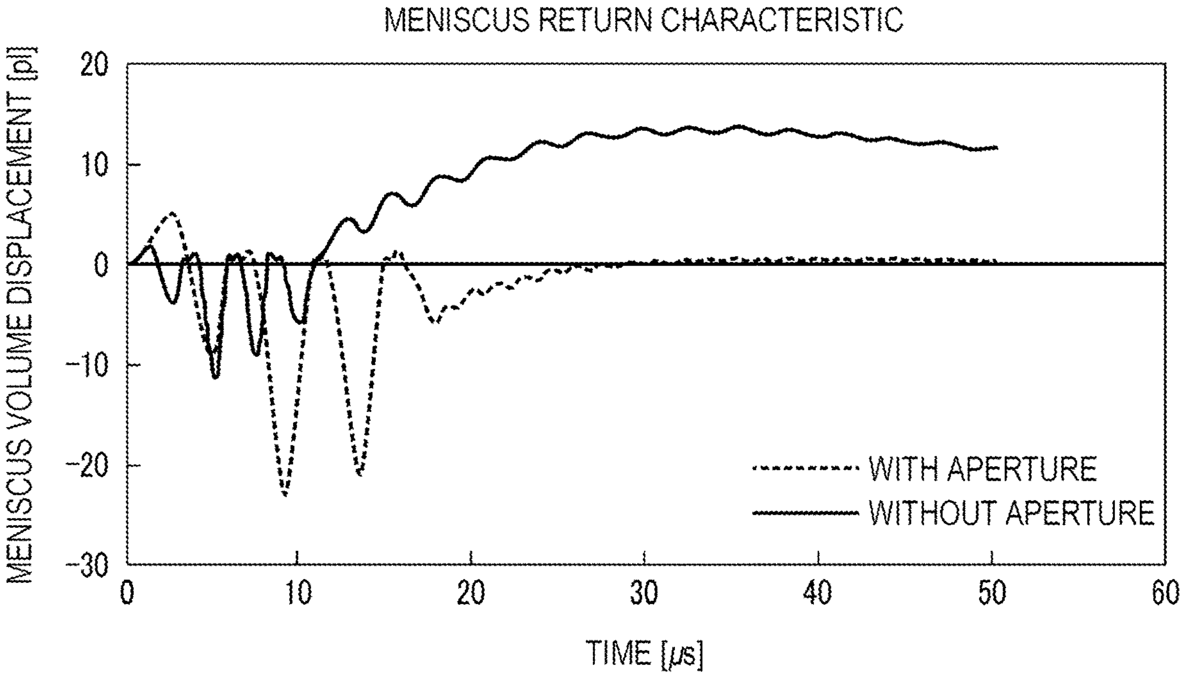
FIG. 15 is a graph showing the meniscus return characteristics of inkjet heads according to Test Example 1 and Test Example 2.

Further, FIG. 15 shows the simulation results of meniscus return in Test Example 1 in which the pressure chamber 31 has the aperture unit 240, and Test Example 2 in which the pressure chamber has no aperture. According to FIG. 15, in the meniscus state of the nozzle at low frequency, there is sufficient time from the ejection of the ink droplet to the ejection of the next droplet, and ink droplets can be ejected in a stable state after waiting for the meniscus to return regardless of the presence of an aperture. On the other hand, in the case of high frequency, since the time from the ejection of dots (e.g. a series of ink droplets for printing one image pixel or the like) to the ejection of the next droplet is short, the ejection of the next droplet starts before the meniscus returns. Therefore, in the case of the inkjet head 1010 without the aperture unit 240, the rise of the meniscus is large after ejection, and the meniscus cannot be restored by the time the next droplet is ejected, and the ejection speed decreases. On the other hand, if the aperture unit 240 is provided, the rise of the meniscus becomes smaller, and thus, the meniscus returns faster and the influence on the next droplet can be reduced. Therefore, from these simulation results, it can be said that providing the aperture unit 240 between the pressure chamber 31 and the common chamber leads to improvement in the ejection stability of the inkjet head 110.

Figure 16A:
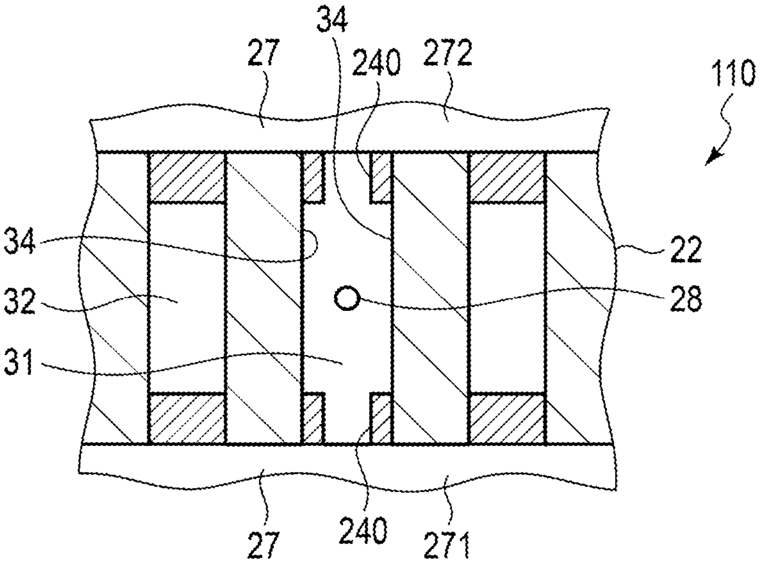
FIGS. 16A and 16B are diagrams of end shooter type inkjet heads according to Test Example 1 and Test Example 3.
Figure 16B:
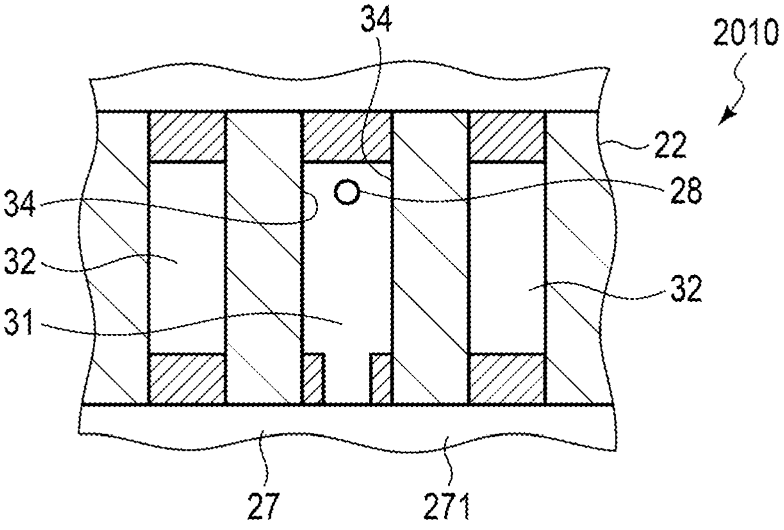

FIGS. 16A and 16B are diagrams of a side shooter type inkjet head 110 as Test Example 1 and a shear mode shared wall type end shooter type inkjet head 2010 as Test Example 3 in which an ink inlet and outlet is formed at one end and a nozzle 28 is formed at the other end.

Figure 17:
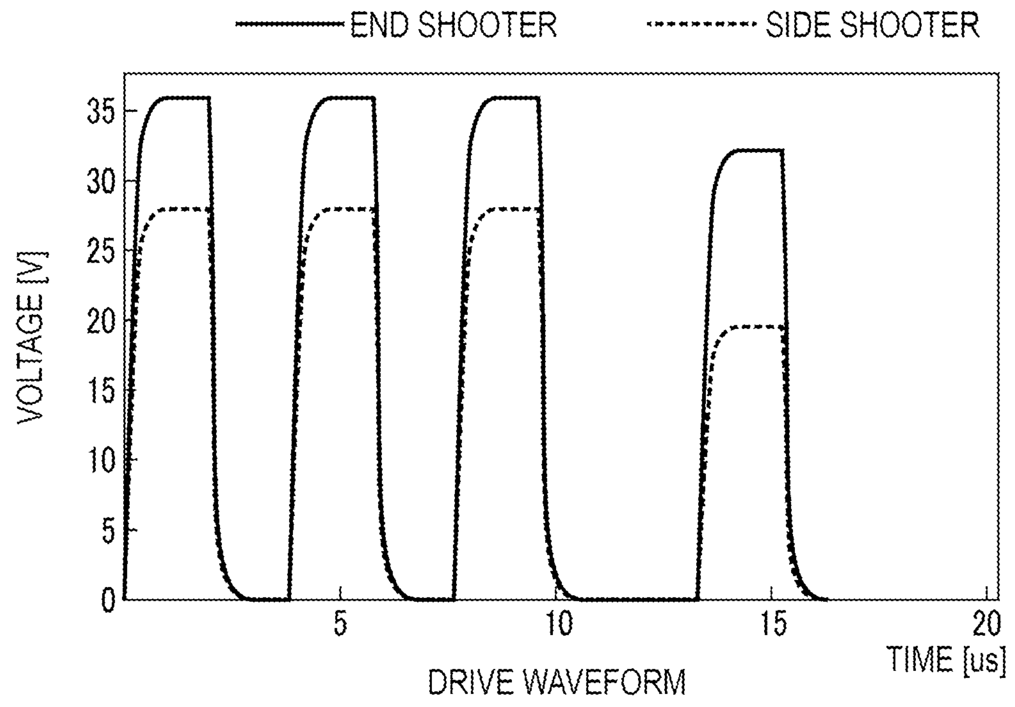
FIG. 17 is a graph showing drive waveforms of inkjet heads according to Test Example 1 and Test Example 3.
Figure 18:
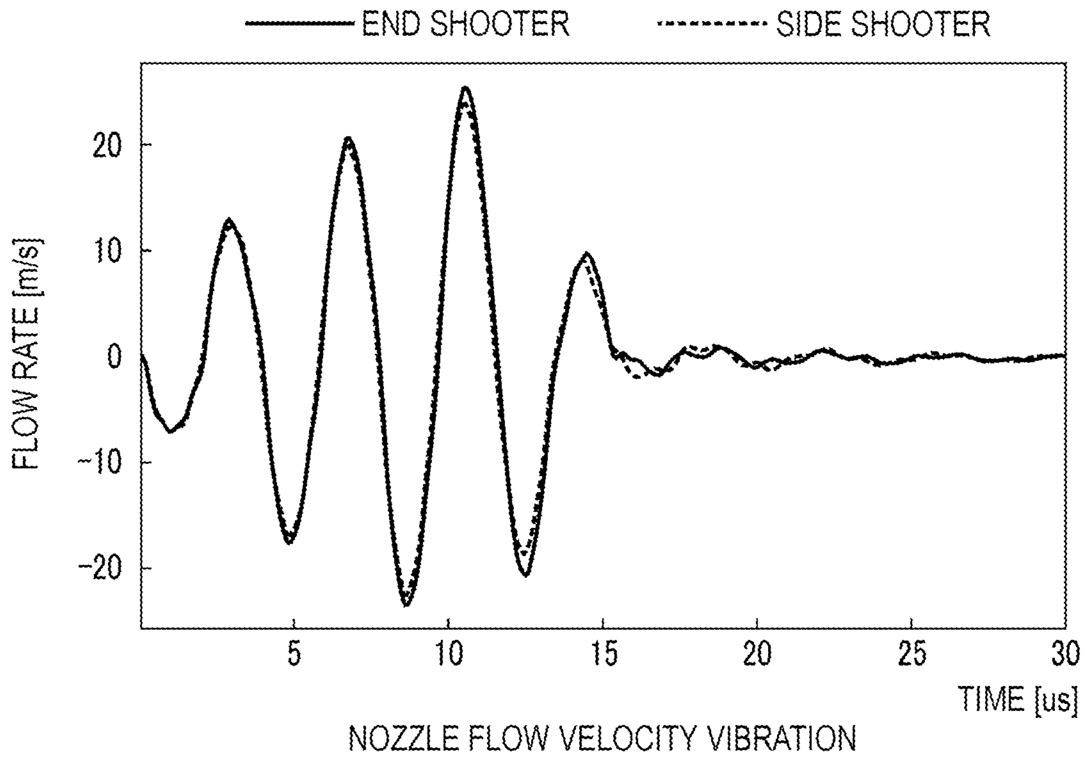
FIG. 18 is a graph showing nozzle flow velocity vibration of inkjet heads according to Test Example 1 and Test Example 3.
Figure 19:
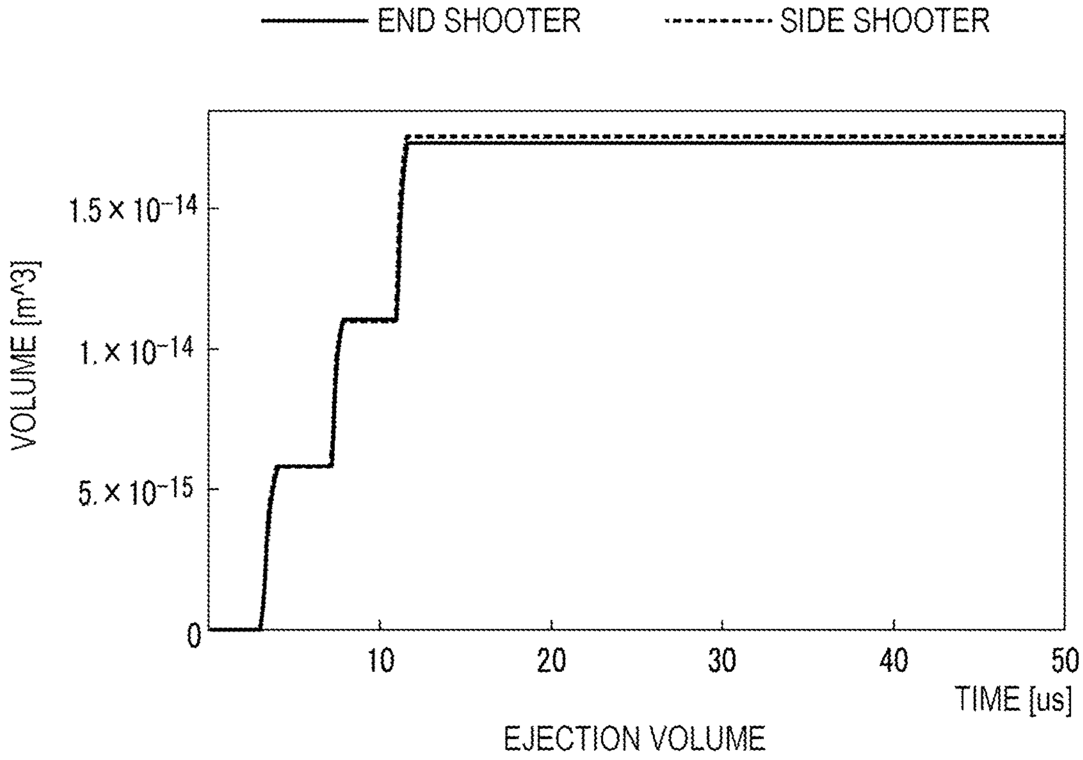
FIG. 19 is a graph showing the ejection volume of inkjet heads according to Test Example 1 and Test Example 3.
Figure 20:
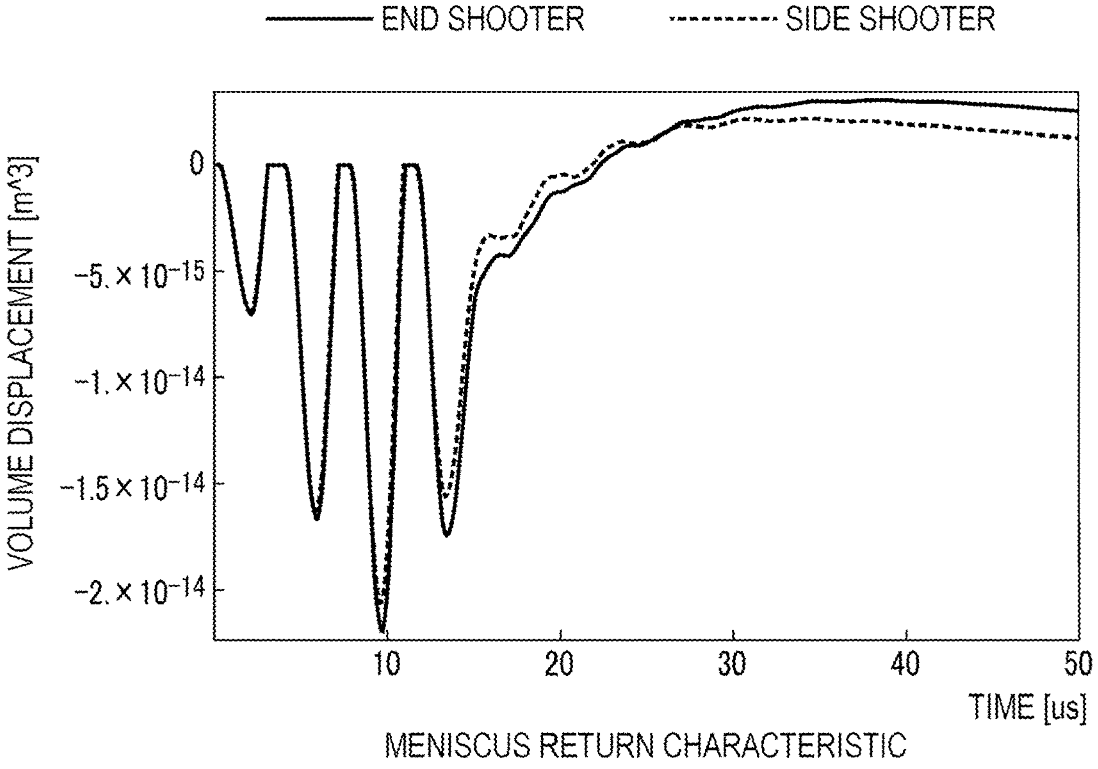
FIG. 20 is a graph showing meniscus return characteristics of inkjet heads according to Test Example 1 and Test Example 3.

FIGS. 17 to 20 are diagrams comparing simulation characteristics if the aperture unit 240 is provided in each of the end shooter type inkjet head 2010 of Test Example 3 and the side shooter type inkjet head 110 of Test Example 1. FIG. 17 shows the drive waveform, FIG. 18 shows the nozzle flow velocity vibration, FIG. 19 shows the ejection volume, and FIG. 20 shows the return characteristics of the meniscus.

Further, the inkjet head 2010 according to Test Example 3 is an end shooter type in which one end side of the pressure chamber 31 in the second direction, which is the extension direction, communicates with the common chamber, the other end is closed, and the nozzle opens at the end of the flow path. That is, the inkjet head 2010 forms a flow path that flows from one side of the second direction toward the nozzle 28.

If the end shooter type inkjet head 2010 supplied from one side as Test Example 3 and the side shooter type inkjet head 110 supplied on both sides as Test Example 1 have the same ejection volume, nozzle flow velocity vibration, and meniscus return characteristics, the drive voltage is the lowest in the side shooter type configuration of supply on both sides, and thus, it can be said that the supply on both sides has a high advantage over the supply on one side from the viewpoint of drive efficiency. That is, the so-called side shooter type inkjet head 110, which has the nozzle 28 in the center of the pressure chamber and ink inlets and outlets at both ends, has better ejection efficiency than the end shooter type inkjet head 2010.

In general, in a shear mode shared wall type inkjet head, for example, since a pressure chamber is composed of fine grooves formed by a diamond cutter in the piezoelectric body, it is difficult to reduce the cross-section of a part of the pressure chamber. According to the above examples, however, it is easy to design the shape of the aperture unit 240 with high accuracy by setting the first portion 2421 sandwiched between the sidewalls 33 to 50% or more of the aperture 242. Further, by reducing the size of the second portion 2422 protruding from the sidewall 33 to the outside of the pressure chamber 31, it is possible to reduce dimensional variation and stabilize the flow path resistance of the aperture 242. Further, in the above examples, since the side surface portion 221 of the actuator member 22 forms an inclined surface, restrictions on the exposure direction are less, and the exposure and development processes are facilitated. In addition, by using machining together, finer patterning can be realized with high accuracy.

Further, in Example 2, the first portion 2421 sandwiched between the sidewalls 33 is set to 80% or more of the aperture 242, and the dimension of the second portion 2422 protruding to the outside of the pressure chamber 31 is set to be equal to or less than the width dimension of the pressure chamber 31, whereby it is possible to reduce the generation of bubbles larger than the inside of the pressure chamber 31. Therefore, the dimensions of the aperture 242 can be set with high accuracy, and the flow path resistance of the aperture 242 can be stabilized.

Further, in Example 3, the first portion 2421 sandwiched between the sidewalls 33 is set to 90% or more of the aperture 242, and the dimension of the second portion 2422 protruding to the outside of the pressure chamber 31 is set to be equal to or less than the thickness of the pressure chamber 31, whereby the influence of swelling and the like can be reduced. That is, even if swelling occurs depending on the type of ink, if the thickness is less than or equal to the thickness of the pressure chamber, swelling can be reduced to a small extent as compared with the case where the thickness of the second portion is larger as shown in FIG. 11 as Comparative Example 2. Therefore, the dimensions of the aperture 242 can be set with high accuracy, and the flow path resistance of the aperture 242 can be stabilized.

Further, in the inkjet head 10 according to the above examples, an aperture is partially formed at the communication port which is the inlet or outlet of the pressure chamber 31, which makes it easier to secure the volume of the pressure chamber 31 than the configuration of reducing the width of the pressure chamber 31 as a whole. Therefore, there are fewer restrictions on the size of the nozzle and the droplet as compared with the configuration in which the width of the pressure chamber is reduced as a whole, and it is easy to maintain the ejection performance.

The present invention is not limited to the above examples, and at the implementation stage, the components can be modified and embodied within a range that does not deviate from the gist thereof.

In the above examples, the first common chamber 271 is arranged on one side of the pressure chamber 31, the second common chamber 272 is arranged on the other side, and the fluid flows in from one side of the pressure chamber and flows out to the other side, but the present disclosure is not limited thereto. For example, the common chambers on both sides of the pressure chamber 31 may be on the supply side and may be configured to flow in from both sides. That is, the fluid may flow in from both sides of the pressure chamber 31 and flow out from the nozzle 28 arranged in the center of the pressure chamber 31. Even in this case, the fluid resistance can be increased and the ejection efficiency can be improved by providing an aperture at the inlet portions on both sides of the pressure chamber 31.

Further, in the above examples, the aperture unit 240 for increasing the flow path resistance is configured to have a pair of protrusions 241 formed on the wall surfaces of the sidewalls 33 on both sides of the pressure chamber 31, but the shape of the aperture unit 240 is not limited thereto. For example, the aperture 242 has a slit shape extending in the third direction, which is the depth direction of the pressure chamber, but may extend in another direction, or may have another shape including a circle or an oval. Further, the shape, position, and size of the aperture units 240 provided on both sides can be set according to the flow path resistance, and may be configured under the same conditions on both sides, or may be configured under conditions in which the aperture units 240 on one side and the other side are different.

In the above examples, the actuator member 22 having a plurality of grooves is arranged on the main surface portion of the substrate 21 is shown, but the present disclosure is not limited thereto. For example, an actuator may be provided on the end surface of the substrate 21. Further, the number of nozzle rows is not limited to two, and one row or three or more rows may be provided.

Further, in the above examples, the actuator base 11 provided with the stacked piezoelectric body made of the piezoelectric member on the substrate 21 is exemplified, but the present disclosure is not limited thereto. For example, the actuator member 22 may be formed only by the piezoelectric member without using a substrate. Further, one piezoelectric member may be used instead of the two piezoelectric members. Further, the dummy chamber 32 may communicate with the first common chamber 271 and the second common chamber 272, which are common chambers. Further, the supply side and the discharge side may be reversed or may be configured to be switchable.

Further, in the above examples, a circulation-type inkjet head was exemplified in which one side of the pressure chamber 31 is the supply side and the other side is the discharge side, and the fluid flows in from one side of the pressure chamber and flows out from the other side, but the present disclosure is not limited thereto. For example, a non-circular type may be used. Further, for example, the common chambers on both sides of the pressure chamber 31 may be the supply side, and the fluid may flow in from both sides. That is, the fluid may flow in from both sides of the pressure chamber 31 and flow out from the nozzle 28 arranged in the center of the pressure chamber 31. Even in such a case, the fluid resistance can be increased and the ejection efficiency can be improved by providing the aperture unit 240 in the communication ports which are the inlets on both sides of the pressure chamber 31. For example, a non-circulating configuration may be provided by not providing a flow path on the discharge side or by closing the flow path on the discharge side. For example, a non-circulating configuration may be provided in which the supply hole 25 may be provided instead of the discharge hole 26, or the flow path on the discharge side is open only at the time of ink replenishment or maintenance and closed at the time of printing.

For example, the liquid to be ejected is not limited to the ink for printing and may be, for example, a liquid containing conductive particles for forming a wiring pattern of a printed wiring board.

Further, in the above examples, the inkjet head is used for a liquid ejection device such as an inkjet printer, but the present disclosure is not limited thereto. The inkjet head can be also used for, for example, a 3D printer, an industrial manufacturing machine, and a medical application, and it is possible to reduce the size, weight, and cost.

According to at least one example described above, it is possible to provide a liquid ejection head and a method for manufacturing a liquid ejection head with stable ejection characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head of a side shooter type, comprising:
- a plate including a plurality of nozzles arranged along a first direction and through which liquid is ejected;
- an actuator including:
  - a plurality of pressure chambers each communicating with a corresponding one of the nozzles,
  - a plurality of dummy chambers each disposed between two of the pressure chambers that are adjacent to each other, and
  - a plurality of sidewalls separating the pressure and dummy chambers along the first direction and deformable to change a volume of each of the pressure chambers according to a drive signal; and
- a pair of covers having a plurality of apertures and partly covering both ends of each of the pressure chambers in a second direction intersecting the first direction such that a pair of protrusions protruding relative to the side walls in the first direction are formed and the pressure chambers communicate with a common chamber at both ends thereof through the apertures, wherein
- each of the covers includes a first portion on and between the sidewalls and a second portion other than the first portion, and a first length in the second direction of the first portion is equal to or greater than a second length in the second direction of the second portion.

2. The liquid ejection head according to claim 1, wherein a fluid resistance in the apertures is higher than a fluid resistance in the pressure chambers.

3. The liquid ejection head according to claim 1, wherein the pair of covers fully cover both ends of each of the dummy chambers in the second direction.

4. The liquid ejection head according to claim 1, wherein the pair of covers are made of a photosensitive resin.

5. The liquid ejection head according to claim 1, wherein the first length is 80% or more of a sum of the first and second lengths.

6. The liquid ejection head according to claim 5, wherein the first length is 95% or more of the sum of the first and second lengths.

7. The liquid ejection head according to claim 1, wherein each of the nozzles is arranged at a position corresponding to a center of the corresponding pressure chamber in the second direction.

8. The liquid ejection head according to claim 1, wherein the liquid is ejected towards a third direction intersecting the first and second directions.

9. The liquid ejection head according to claim 1, wherein a width of each of the apertures in the first direction is smaller than a width of each of the pressure chambers in the first direction.

10. The liquid ejection head according to claim 1, wherein the second length is equal to or less than a width of each of the pressure chambers in the first direction.

11. A liquid ejecting device, comprising:

a conveyer configured to convey a medium along a predetermined conveyance path; and a liquid ejecting head of a side shooter type, including:

a plate including a plurality of nozzles arranged along a first direction and through which liquid is ejected toward the medium, an actuator including:

a plurality of pressure chambers each communicating with a corresponding one of the nozzles, a plurality of dummy chambers each disposed between two of the pressure chambers that are adjacent to each other, and a plurality of sidewalls separating the pressure and dummy chambers along the first direction and deformable to change a volume of each of the pressure chambers according to a drive signal, and a pair of covers having a plurality of apertures and partly covering both ends of each of the pressure chambers in a second direction intersecting the first direction such that a pair of protrusions protruding relative to the side walls in the first direction are formed and the pressure chambers communicate with a common chamber at both ends thereof through the apertures, wherein each of the covers includes a first portion on and between the sidewalls and a second portion other than the first portion, and a first length in the second direction of the first portion is equal to or greater than a second length in the second direction of the second portion.

12. The liquid ejection device according to claim 11, wherein a fluid resistance in the apertures is higher than a fluid resistance in the pressure chambers.

13. The liquid ejection device according to claim 11, wherein the pair of covers fully cover both ends of each of the dummy chambers in the second direction.

14. The liquid ejection device according to claim 11, wherein the pair of covers are made of a photosensitive resin.

15. The liquid ejection device according to claim 11, wherein the first length is 80% or more of a sum of the first and second lengths.

16. The liquid ejection device according to claim 15, wherein the first length is 95% or more of the sum of the first and second lengths.

17. The liquid ejection device according to claim 11, wherein each of the nozzles is arranged at a position corresponding to a center of the corresponding pressure chamber in the second direction.

18. The liquid ejection device according to claim 11, wherein the liquid is ejected towards a third direction intersecting the first and second directions.

19. The liquid ejection device according to claim 11, wherein a width of each of the apertures in the first direction is smaller than a width of each of the pressure chambers in the first direction.

20. The liquid ejection device according to claim 11, wherein the second length is equal to or less than a width of each of the pressure chambers in the first direction.

* * * * *